(12) United States Patent
McClure

(10) Patent No.: US 9,808,893 B2
(45) Date of Patent: Nov. 7, 2017

(54) APPARATUS FOR ALIGNING SECTIONS OF PIPE

(71) Applicant: Matthew W. McClure, South Charleston, WV (US)

(72) Inventor: Matthew W. McClure, South Charleston, WV (US)

(73) Assignee: Walhonde Tools Inc., South Charleston, WV (US)

( * ) Notice: Subject to any disclaimer, the term of this patent is extended or adjusted under 35 U.S.C. 154(b) by 1 day.

(21) Appl. No.: 14/575,931

(22) Filed: Dec. 18, 2014

(65) Prior Publication Data

US 2015/0174706 A1 Jun. 25, 2015

(51) Int. Cl.
| | | |
|---|---|---|
| *B23K 37/053* | (2006.01) | |
| *B23K 31/02* | (2006.01) | |
| *B23K 101/10* | (2006.01) | |
| *B25B 5/00* | (2006.01) | |
| *B25B 5/14* | (2006.01) | |

(52) U.S. Cl.
CPC .......... *B23K 37/0533* (2013.01); *B23K 31/02* (2013.01); *B25B 5/003* (2013.01); *B25B 5/147* (2013.01); *B23K 2201/10* (2013.01)

(58) Field of Classification Search
CPC ............ B23K 37/0435; B23K 37/0531; B23K 37/0533; B23K 37/0536; B25B 27/10; B25B 27/16
See application file for complete search history.

(56) References Cited

U.S. PATENT DOCUMENTS

| | | | | |
|---|---|---|---|---|
| 2,127,828 A | * | 8/1938 | Milton | B23K 37/0533 269/200 |
| 2,800,867 A | * | 7/1957 | Smith | B23K 37/0533 269/152 |
| 3,252,192 A | * | 5/1966 | Smith | F16L 1/10 138/99 |
| 3,400,872 A | * | 9/1968 | Rogers | B23K 37/0533 228/44.5 |
| 3,555,875 A | * | 1/1971 | Clark | B23K 37/0536 72/292 |
| 3,743,330 A | * | 7/1973 | Itatani | F16B 7/06 29/463 |
| 3,979,814 A | * | 9/1976 | Lajoie | F16L 1/10 29/272 |

(Continued)

*Primary Examiner* — Monica Carter
*Assistant Examiner* — Seahee Yoon
(74) *Attorney, Agent, or Firm* — Kelley Drye & Warren, LLP

(57) ABSTRACT

An apparatus for aligning sections of pipe includes a first clamp member and a second clamp member coupled with the first clamp member. The first and second clamp members each include a first clamp jaw and a second clamp jaw longitudinally spaced from the first clamp jaw. Each one of a first plurality of turnbuckle assemblies is coupled with each one of the first and second clamp jaws of the first clamp member, and each one of a second plurality of turnbuckle assemblies is coupled with each one of the first and second clamp jaws of the second clamp member. An assembly made from a kit of components is also disclosed. The kit includes an apparatus for aligning sections of pipe, and a plurality of shoe inserts. The assembly includes the apparatus and at least two of the shoe inserts coupled with the apparatus.

31 Claims, 28 Drawing Sheets

(56) References Cited

U.S. PATENT DOCUMENTS

| | | | | |
|---|---|---|---|---|
| 4,457,117 | A * | 7/1984 | Leiher | E04B 2/7416 403/294 |
| 4,493,139 | A | 1/1985 | McClure | |
| 4,579,272 | A | 4/1986 | McClure | |
| 4,635,970 | A * | 1/1987 | Haines | F16L 21/08 285/114 |
| 4,722,468 | A | 2/1988 | McClure | |
| 4,769,889 | A | 9/1988 | Landman et al. | |
| 4,846,391 | A | 7/1989 | McClure | |
| 4,936,500 | A | 6/1990 | McClure | |
| 5,052,608 | A * | 10/1991 | McClure | B23K 37/0533 228/44.5 |
| 5,118,024 | A | 6/1992 | McClure | |
| 5,141,276 | A * | 8/1992 | McClure | B66C 1/62 294/104 |
| 5,161,828 | A * | 11/1992 | Hynes | F16L 55/1007 166/347 |
| 5,228,181 | A | 7/1993 | Ingle | |
| 5,481,793 | A | 1/1996 | McClure | |
| 5,645,268 | A | 7/1997 | Konno | |
| 5,738,386 | A | 4/1998 | Barefoot et al. | |
| 5,865,430 | A | 2/1999 | Conover et al. | |
| 5,873,611 | A * | 2/1999 | Munley | F16L 23/10 24/20 W |
| 6,016,592 | A | 1/2000 | Lavender | |
| 6,325,277 | B1 * | 12/2001 | Collie | B23K 37/0533 228/212 |
| 6,357,735 | B2 | 3/2002 | Haverinen | |
| 6,427,993 | B1 | 8/2002 | Prochac | |
| 6,688,200 | B1 | 2/2004 | Borzym | |
| 6,698,322 | B2 | 3/2004 | Borzym | |
| 6,775,890 | B2 | 8/2004 | Kolarik | |
| 6,840,433 | B2 | 1/2005 | Vermaat | |
| 6,983,525 | B2 | 1/2006 | Moreno | |
| 6,990,712 | B2 | 1/2006 | Shelton | |
| 7,017,253 | B1 | 3/2006 | Riggle | |
| 7,089,887 | B1 | 8/2006 | McClure | |
| 7,540,401 | B2 | 6/2009 | Vermaat | |
| 7,657,985 | B2 | 2/2010 | McClure | |
| 7,780,065 | B2 | 8/2010 | Vermaat | |
| 8,335,292 | B2 * | 12/2012 | Koepke | B23K 37/0435 376/277 |
| 8,348,253 | B2 | 1/2013 | McClure | |
| 8,397,975 | B1 | 3/2013 | Franco | |
| 8,490,261 | B2 * | 7/2013 | Frenken | B21D 39/046 285/382.1 |
| 8,746,536 | B2 | 6/2014 | Uecker | |
| 8,864,182 | B2 | 10/2014 | Buchanan | |
| 2003/0106968 | A1 * | 6/2003 | Terrill | B25B 27/10 248/58 |
| 2007/0256288 | A1 * | 11/2007 | Vermaat | B23K 37/0533 29/464 |
| 2007/0296133 | A1 | 12/2007 | McClure | |
| 2010/0140323 | A1 | 6/2010 | McClure | |

* cited by examiner

APPARATUS FOR ALIGNING SECTIONS OF PIPE

CROSS-REFERENCE TO RELATED APPLICATION

This application claims the priority benefit of U.S. Provisional Patent Application Ser. No. 61/918,263, "Apparatus For Joining And Aligning Sections of Pipe", filed Dec. 19, 2013, which is hereby expressly incorporated by reference herein in its entirety.

TECHNICAL FIELD

The present invention generally relates to an apparatus that serves to hold the adjacent ends of two separate sections of pipe securely, so that they may be effectively welded or otherwise joined to form a single continuous pipe.

BACKGROUND

Known devices for aligning two adjacent sections of pipe, to facilitate welding the sections of pipe together, include devices that are capable of adjusting the longitudinal and lateral positions of the sections of pipe, and within certain limitations, of adjusting the orientations of the end faces of the sections of pipe between an angular orientation and a parallel orientation.

SUMMARY

According to one embodiment, an apparatus for aligning sections of pipe, includes a first clamp member, a second clamp member, a first hinge and a second hinge. The first clamp member includes a first clamp jaw and a second clamp jaw longitudinally spaced from the first clamp jaw. The second clamp member includes a first clamp jaw and a second clamp jaw longitudinally spaced from the first clamp jaw. Each of the first clamp jaw of the first clamp member and the first clamp jaw of the second clamp member is pivotally coupled with the first hinge. Each of the second clamp jaw of the first clamp member and the second clamp jaw of the second clamp member is pivotally coupled with the second hinge. The apparatus also includes a first plurality of turnbuckle assemblies and a second plurality of turnbuckle assemblies. Each of the first plurality of turnbuckle assemblies is coupled with each one of, and is adjustable to vary the longitudinal spacing between, the first clamp jaw and the second clamp jaw of the first clamp member. Each of the second plurality of turnbuckle assemblies is coupled with each one of, and is adjustable to vary the longitudinal spacing between, the first clamp jaw and the second clamp jaw of the second clamp member.

According to another embodiment, an apparatus for aligning sections of pipe includes a first clamp member, a second clamp member hingedly coupled with the first clamp member, and a plurality of turnbuckle assemblies. The first clamp member includes a first clamp jaw and a second clamp jaw longitudinally spaced from the first clamp jaw. The second clamp member includes a first clamp jaw and a second clamp jaw longitudinally spaced from the first clamp jaw. Each one of the turnbuckle assemblies includes a rod and a torquing member secured to the rod, and also includes a first clevis and a second clevis. Each one of the first clevis and the second clevis is threadedly engaged with rod. For each of the turnbuckle assemblies, the first clevis and the second clevis each have a length, and the torquing member includes a first end surface and a second end surface spaced from the first end surface by a first distance. The first end surface of the torquing member is spaced from the first clevis by a second distance, and the second end surface of the torquing member is spaced from the second clevis by a third distance. The length of each one of the first clevis and the second clevis is greater than each one of the first distance, the second distance, and the third distance. Each one of a first plurality of the turnbuckle assemblies is coupled with each one of, and is adjustable to vary the longitudinal spacing between, the first clamp jaw and the second clamp jaw of the first clamp member. Each one of a second plurality of the turnbuckle assemblies is coupled with each one of, and is adjustable to vary the longitudinal spacing between, the first clamp jaw and the second clamp jaw of the second clamp member.

According to another embodiment, an apparatus for aligning sections of pipe includes a first clamp member, a second clamp member hingedly coupled with the first clamp member, a first plurality of turnbuckle assemblies, a second plurality of turnbuckle assemblies, and a plurality of spacers. The first clamp member includes a first clamp jaw and a second clamp jaw longitudinally spaced from the first clamp jaw. The second clamp member includes a first clamp jaw and a second clamp jaw longitudinally spaced from the first clamp jaw. Each of the first plurality of turnbuckle assemblies is coupled with each one of the first clamp jaw and the second clamp jaw of the first clamp member. Each of the second plurality of turnbuckle assemblies is coupled with each one of the first clamp jaw and the second clamp jaw of the second clamp member. Each one of the first clamp jaw and the second clamp jaw of the first clamp member, and each one of the first clamp jaw and the second clamp jaw of the second clamp member, includes a first frame and a second frame spaced from the first frame by at least a respective pair of the spacers. Each one of the first frame and the second frame includes a plurality of layered plates.

According to another embodiment, an assembly is made from a kit of components. The kit includes an apparatus for aligning sections of pipe and a plurality of shoe inserts. The apparatus is configured to adjust the positions of a first section of pipe and a second section of pipe, at least longitudinally and laterally, to align the first section of pipe to the second pipe section, and to facilitate joining the first and second sections of pipe. Each one of the first and second sections of pipe includes an outside diameter having a first magnitude. Each one of the shoe inserts is configured to engage a section of pipe including an outside diameter having a second magnitude. The second magnitude is less than the first magnitude. The apparatus includes a first clamp member and a second clamp member hingedly coupled with the first clamp member. The assembly includes the apparatus for aligning sections of pipe and at least one of the shoe inserts coupled with the first clamp member and at least another one of the shoe inserts coupled with the second clamp member.

BRIEF DESCRIPTION OF THE DRAWINGS

Various embodiments of an apparatus for aligning sections of pipe, as well as an assembly comprising the apparatus and a plurality of shoe inserts coupled with the apparatus, will become better understood with regard to the following description, appended claims and accompanying drawings wherein:

DETAILED DESCRIPTION

Figure 1:
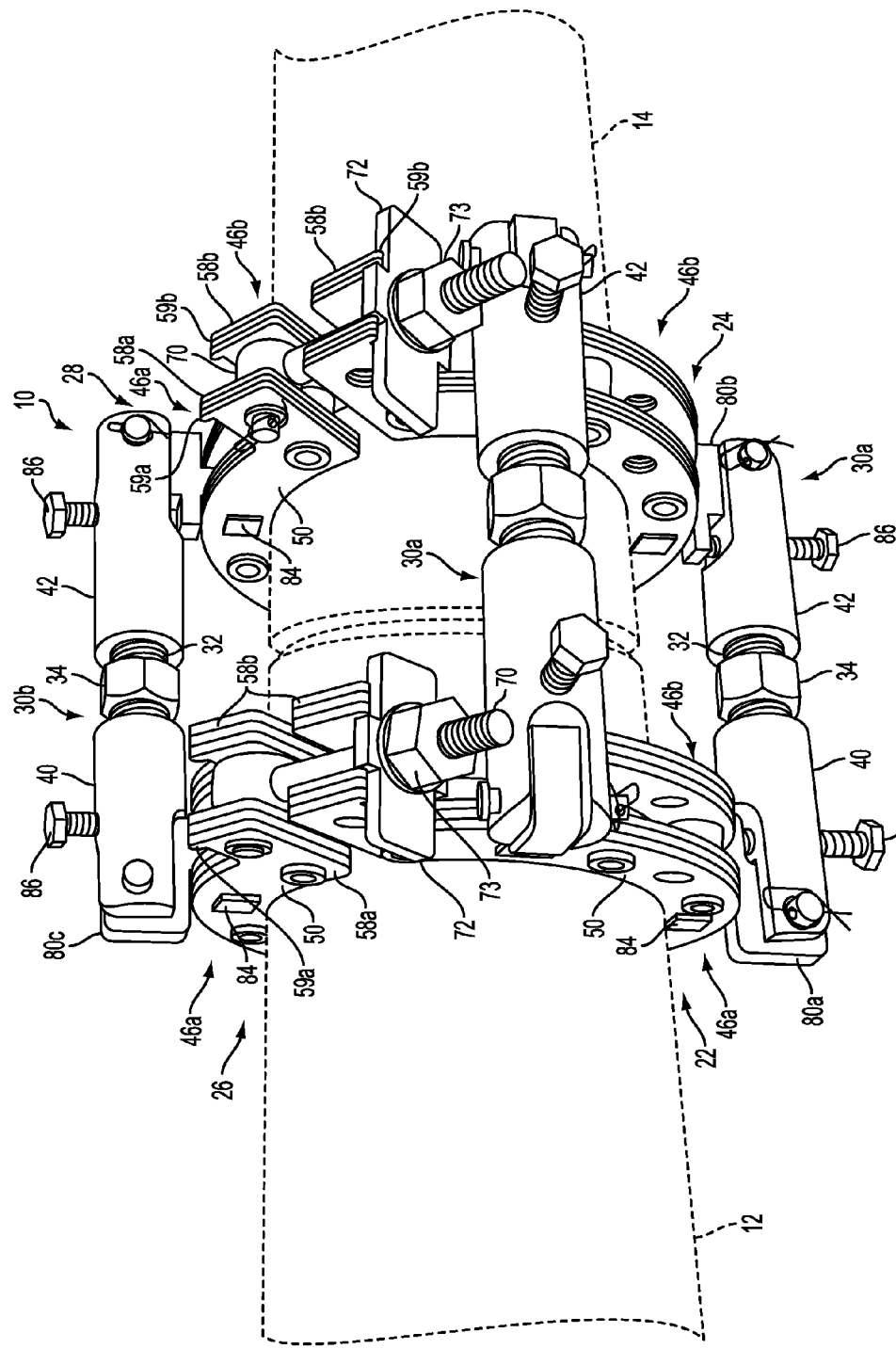
FIG. 1 is a perspective view of an apparatus for aligning sections of pipe according to one embodiment, with the apparatus being depicted in a closed position and in association with first and second sections of pipe.

Referring to the drawings, wherein like reference numbers indicate the same or corresponding elements throughout the views, FIGS. 1-8 illustrate an apparatus 10 for aligning sections of pipe according to one embodiment. Apparatus 10 can be used to align two adjacent sections of pipe, and to securely hold the two sections of pipe, to facilitate welding, or otherwise joining, the sections of pipe together to form a single, continuous pipe. For example, FIG. 1 illustrates apparatus 10 in surrounding relationship with a first section of pipe 12, and an adjacent, second section of pipe 14, to facilitate welding pipe sections 12 and 14, or to facilitate joining pipe sections 12 and 14 using a different process.

Figure 2:
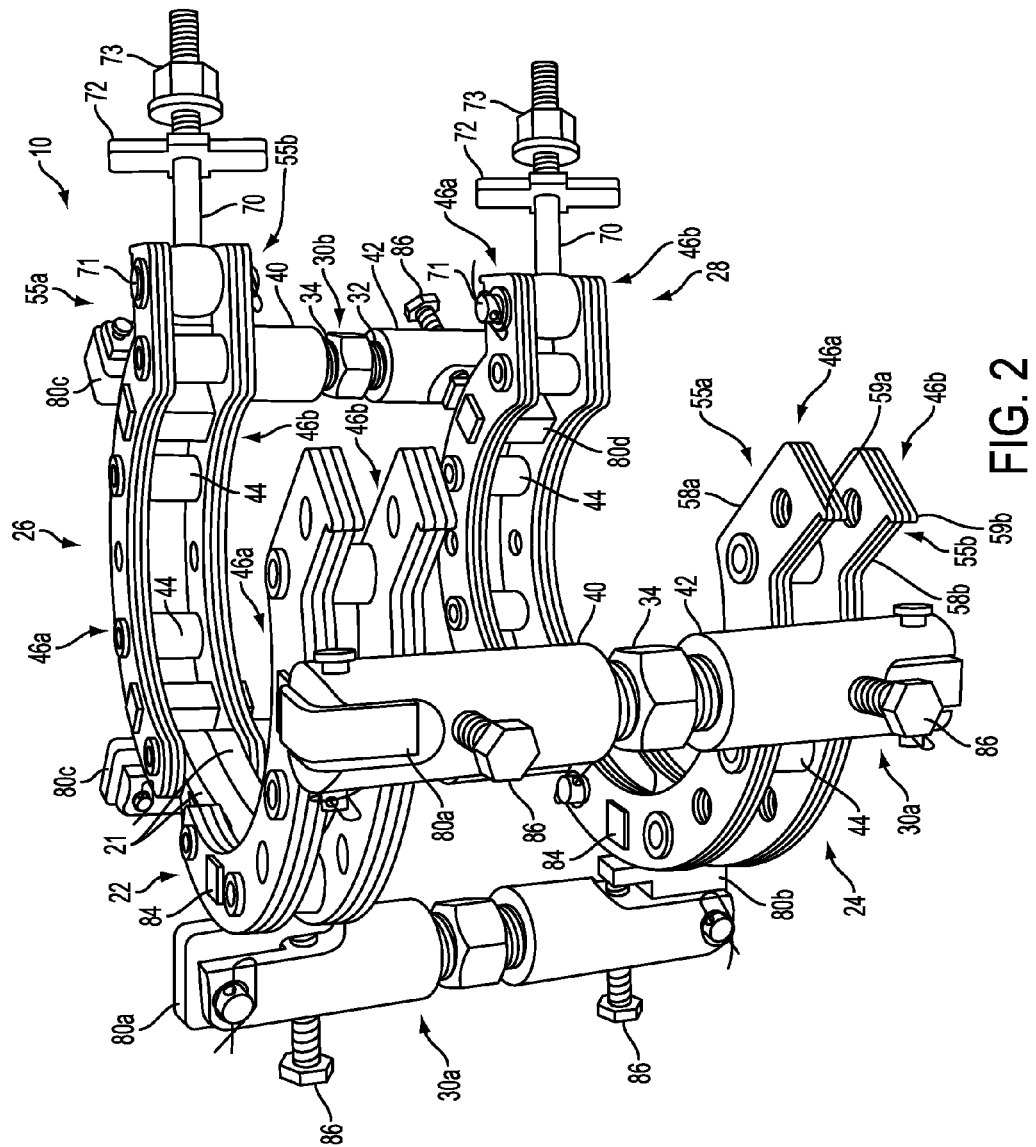
FIG. 2 is a perspective view of the apparatus of FIG. 1, but with the apparatus being depicted in an upright orientation, rather than a horizontal orientation for purposes of illustration, and with the apparatus being depicted in an open position.
Figure 4:
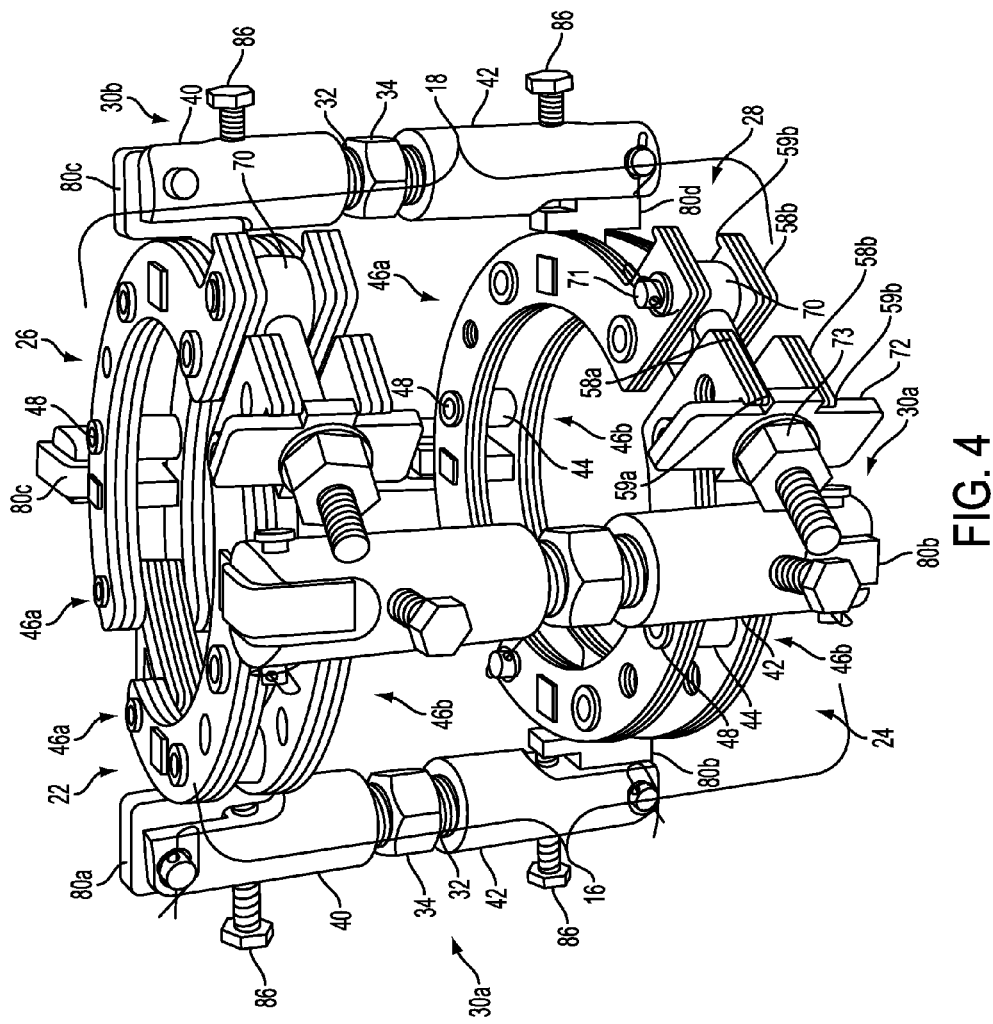
FIG. 4 is a perspective view similar to FIG. 2, but with the apparatus being depicted in a closed position.
Figure 7:
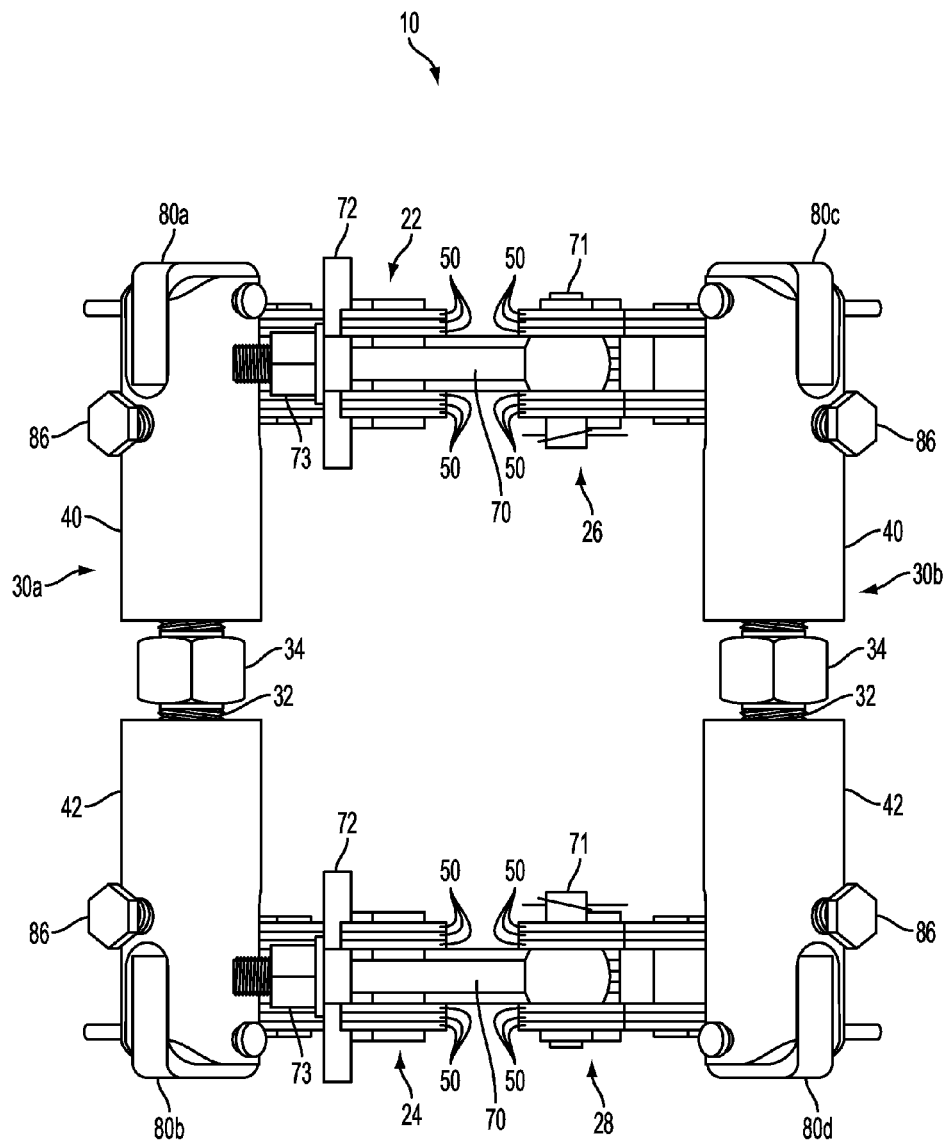
FIG. 7 is another elevation view of the apparatus in a closed position as shown in FIG. 4, depicting a pair of latch bolts and associated latch plates of the apparatus, in association with the first and second clamp members.
Figure 8:
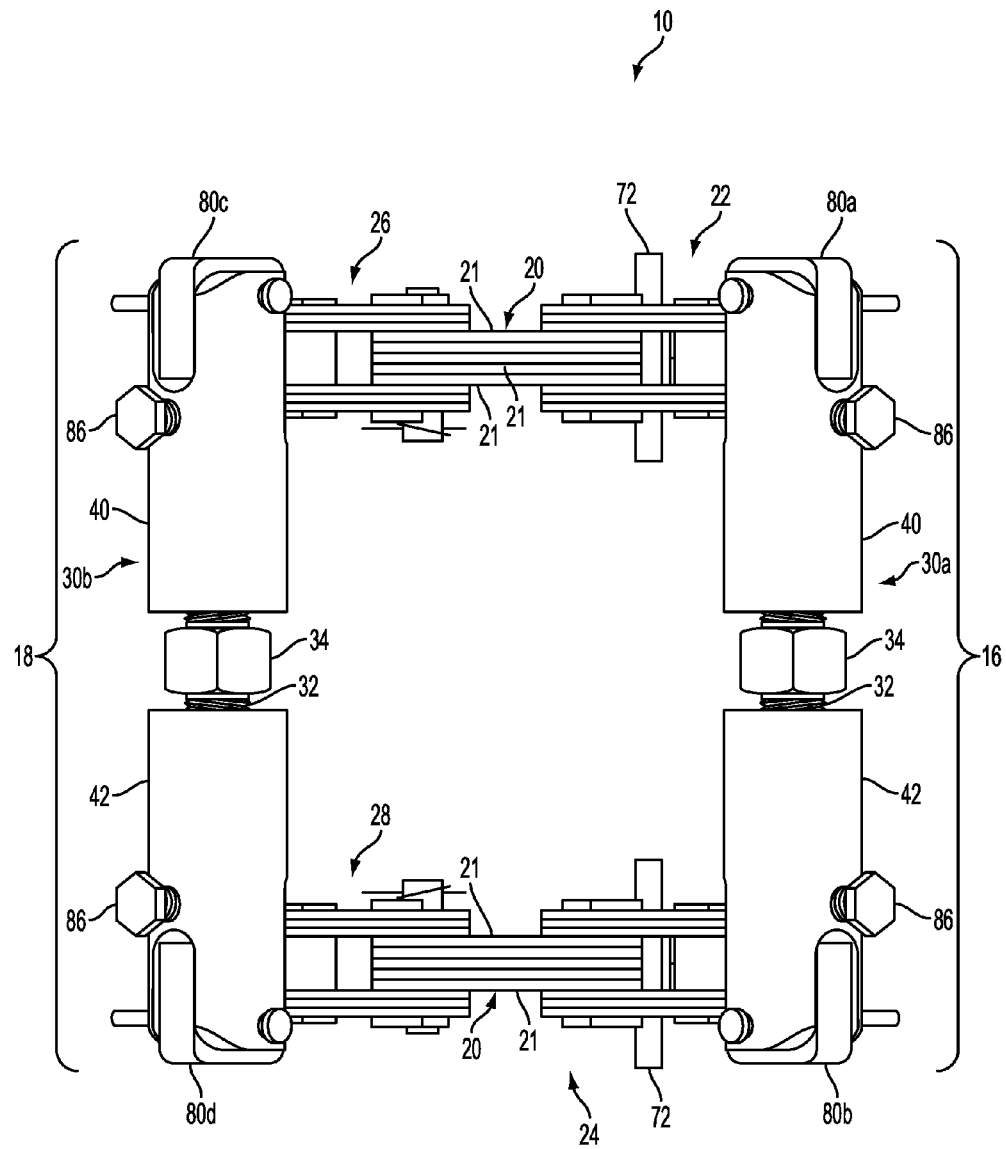
FIG. 8 is yet another elevation view of the apparatus, as shown in FIG. 4, depicting a pair of hinges of the apparatus which hingedly couple the first clamp member of the apparatus with the second clamp member of the apparatus.

Referring to FIG. 4, apparatus 10 can include a first clamp member 16 and a second clamp member 18, which can be coupled with the first clamp member 16. In one embodiment, the first clamp member 16 can be hingedly coupled with the second clamp member 18 with a pair of hinges 20 (FIG. 8). Each one of the first clamp member 16 and the second clamp member 18 can be pivotable between an open position, for example, as shown in FIG. 2, and a closed position (FIGS. 1, 4 and 7). The first clamp member 16 and the second clamp member 18 can be opened sufficiently to receive first and second sections of pipe. Each one of the first clamp member 16 and the second clamp member 18, as well as other components of the apparatus 10, can be constructed from stainless steel, or any other durable and strong metal alloy or metal. Each of the hinges 20 can be constructed from a plurality of plates 21, for example, two or more plates 21 (FIGS. 2 and 8). Alternatively, each hinge 20 can be constructed from a single member, for example, a single plate.

The first clamp member 16 can include a first clamp jaw 22 and a second clamp jaw 24 longitudinally spaced from the first clamp jaw 22. The second clamp member 18 can include a first clamp jaw 26 and a second clamp jaw 28 longitudinally spaced from the first clamp jaw 26. Each one of the first clamp jaw 22 of the first clamp member 16 and the first clamp jaw 26 of the second clamp member 28 can be pivotally coupled with a first one of the hinges 20, and each one of the second clamp jaw 24 of the first clamp member 16 and the second clamp jaw 28 of the second clamp member 18 can be pivotally coupled with a second one of the hinges 20.

Each one of the first clamp jaw 22 of the first clamp member 16, and the first clamp jaw 26 of the second clamp member 18, can be configured to surround and engage respective portions of a first section of pipe, for example, respective portions of the first section of pipe 12, as shown in FIG. 1, when each one of the first clamp member 16 and the second clamp member 18 is in the respective closed position. Each one of the second clamp jaw 24 of the first clamp member 16, and the second clamp jaw 28 of the second clamp member 18, can be configured to surround and engage respective portions of a second section of pipe, for example, respective portions of the second section of pipe 14, as shown in FIG. 1, when each of the first clamp member 16 and the second clamp member 18 is in the respective closed position. The first clamp member 16 can be secured to the second clamp member 18 when each is in the respective closed position. In one embodiment, the first clamp member 16 can be clamped to the second clamp member 18 when each is in the respective closed position.

Figure 10:
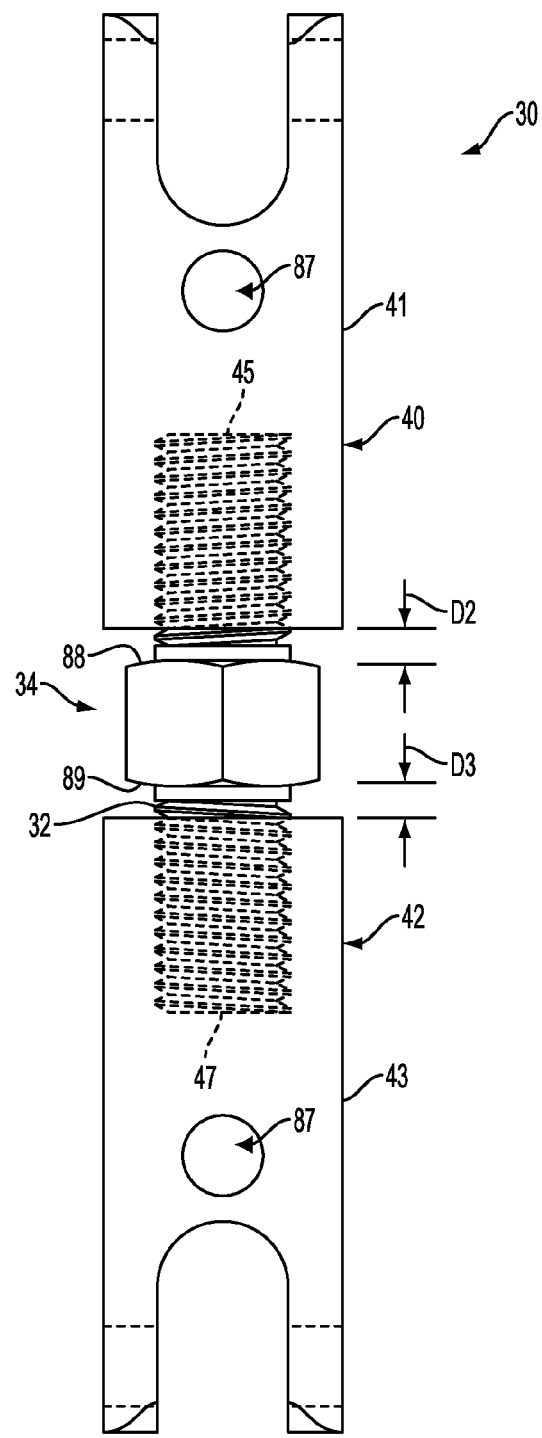
FIG. 10 is a plan view of a turnbuckle assembly of the apparatus of FIG. 2.
Figure 11:
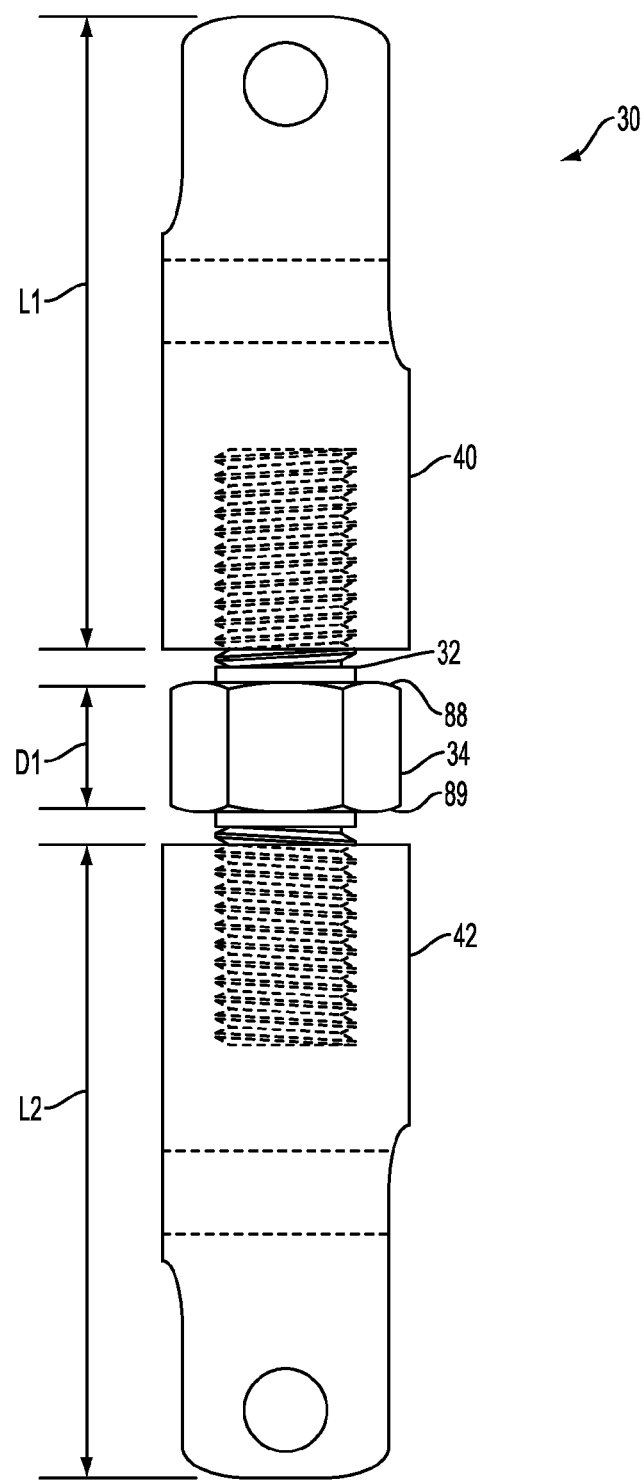
FIG. 11 is a plan view similar to FIG. 10, but with the turnbuckle assembly rotated 90 degrees.
Figure 12:
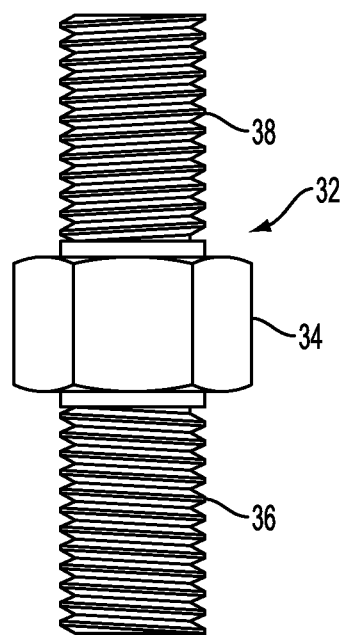
FIG. 12 is a plan view depicting a rod and a torquing member of the turnbuckle assembly of FIG. 10.

The apparatus 10 can also include a plurality of turnbuckle assemblies 30. As shown in FIGS. 10 and 11, each turnbuckle assembly 30 can include a rod 32 and a torquing member 34 secured to the rod 32, for example, by welding the torquing member 34 to the rod 32. In one embodiment, the torquing member 34 can be a nut, which can have a polygonal shape, as shown in FIGS. 10-12. In other embodiments, torquing members having other shapes and configurations, for example, torquing members having an elongated shape, can be secured to a rod of a turnbuckle assembly. The rod 32 of the turnbuckle assembly 30 can include a first portion 36 (FIG. 12) having right-hand male threads and a second portion 38 (FIG. 12) having left-hand male threads. The turnbuckle assembly 30 can also include a first clevis 40 and a second clevis 42 (FIGS. 10-11), with each being threadedly engaged with the rod 32. For example, each of the first clevis 40 and the second clevis 42 can define female threads, which permit the first clevis 40 to be threaded onto one of the first portion 36 and the second portion 38 of the rod 32, and which permit the second clevis 42 to be threaded onto the other one of the first portion 36 and the second portion 38 of the rod 32. The torquing member 34 can be positioned between the first clevis 40 and the second clevis 42.

Each one of a first of plurality of the turnbuckle assemblies 30, designated 30a in FIGS. 1-5, 7 and 8, can be coupled with each one of the first clamp jaw 22 and the second clamp jaw 24 of the first clamp member 16, and can be adjustable, to vary the longitudinal spacing between the first clamp jaw 22 and the second clamp jaw 24 of the first clamp member 16. Each one of a second plurality of the turnbuckle assemblies, designated 30b in FIGS. 1-8, can be coupled with each one of the first clamp jaw 26 and the second clamp jaw 28 of the second clamp member 18, and can be adjustable to vary the longitudinal spacing between the first clamp jaw 26 and the second clamp jaw 28. The first plurality of turnbuckle assemblies 30a can be circumferentially spaced along the first clamp member 16, and the second plurality of turnbuckle assemblies 30b can be circumferentially spaced along the second clamp member 18.

Each of the turnbuckle assemblies 30 can be adjusted by rotating the respective torquing member 34 and rod 32. As a result of the first portion 36 of the rod 32 having right-hand male threads and the second portion 38 of the rod 32 having left-hand male threads, rotation of the torquing member 34 and rod 32 in one direction can cause the first clevis 40 and the second clevis 42 to move toward each other, and rotation of the torquing member 34 and the rod 32 in the opposite direction can cause the first clevis 40 and the second clevis 42 to move away from each other.

In one embodiment, the first clevis 40 and the second clevis 42 can have different colors, which can facilitate the assembly and use of the turnbuckle assemblies 30. In one embodiment, one of the first clevis 40 and the second clevis 42 can have a silver color, as a result of zinc plating, and the other one of the first clevis 40 and the second clevis 42 can be plated to have a gold color. However, in other embodiments, any one of a variety of other color combinations can be used. In yet another embodiment, the first clevis 40 and the second clevis 42 can have the same color.

It can be desirable to have the first clamp jaw 22 and the second clamp jaw 24 of the first clamp member 16 move toward each other, and to have the first clamp jaw 26 and the second clamp jaw 28 of the second clamp member 18 move toward each other, when the torquing member 34 and the rod 32 of each one of the first plurality of turnbuckle assemblies 30a, and each one of the torquing member 34 and the rod 32 of the second plurality of turnbuckle assemblies 30b, respectively, is rotated in a first direction. Further, it can be desirable to have the first clamp jaw 22 and the second clamp jaw 24 move away from each other, and to have the first clamp jaw 26 and the second clamp jaw 28 move away from each other, when the torquing member 34 and the rod 32 of each one of the first plurality of turnbuckle assemblies 30a, and each one of the second plurality of turnbuckle assemblies 30b, respectively, is rotated in a second, opposite direction. This can be achieved by: coupling the first clevis 40 of each one of the first plurality of turnbuckle assemblies 30a to the first clamp jaw 22 of the first clamp member 16; coupling the second clevis 42 of each one of the first plurality of turnbuckle assemblies 30a to the second clamp jaw 24 of the first clamp member 16; coupling the first clevis 40 of each one of the second plurality of turnbuckle assemblies 30b to the first clamp jaw 26 of the second clamp member 18; and coupling the second clevis 42 of each one of the second plurality of turnbuckle assemblies 30b to the second clamp jaw 28 of the second clamp member 18. This arrangement can be facilitated by the color coding of the first clevis 40 and the second clevis 42.

Alternatively, the advantageous use of a color convention for the first clevis 40 and the second clevis 42 can be achieved by: coupling the second clevis 42 of each one of the first plurality of turnbuckle assemblies 30a to the first clamp jaw 22 of the first clamp member 16; coupling the first clevis 40 of each one of the first plurality of turnbuckle assemblies 30a to the second clamp jaw 24 of the first clamp member 16; coupling the second clevis 42 of each one of the second plurality of turnbuckle assemblies 30b to the first clamp jaw 26 of the second clamp member 18; and coupling the first clevis 40 of each one of the second plurality of turnbuckle assemblies 30b to the second clamp jaw 28 of the second clamp member 18.

Figure 3:
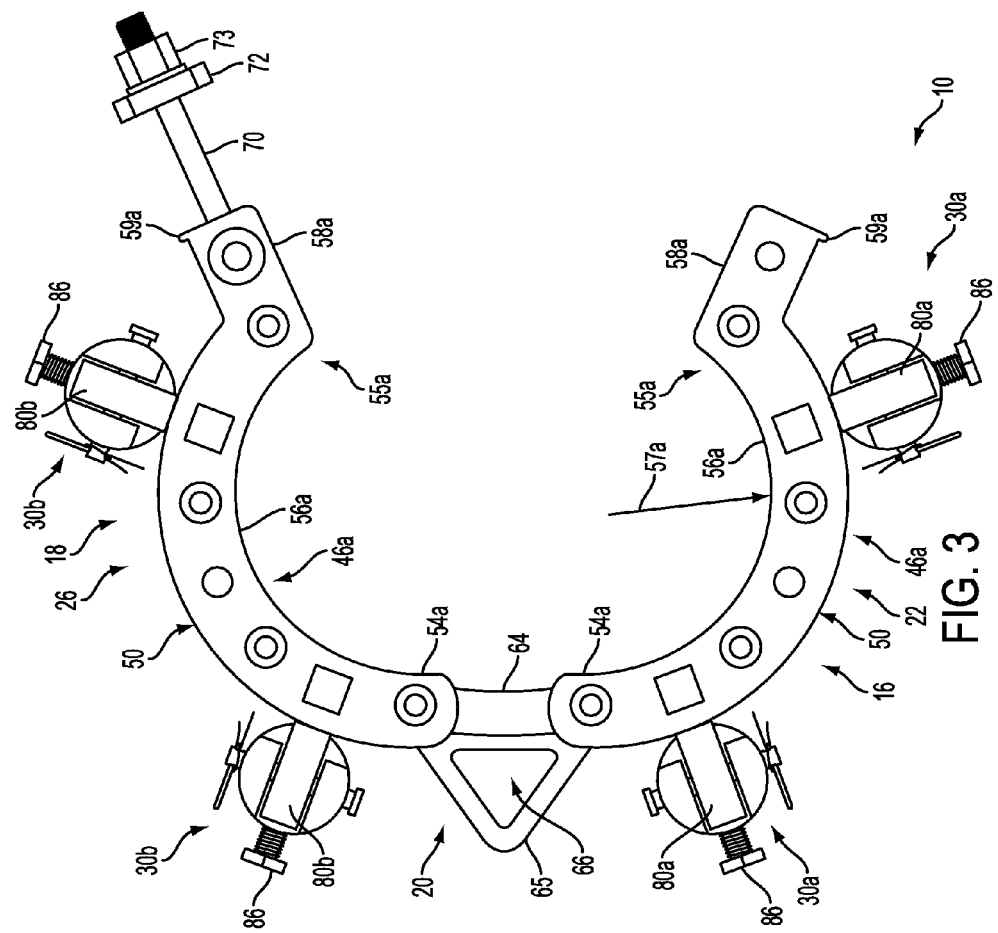
FIG. 3 is an end view of the apparatus of FIG. 2.
Figure 5:
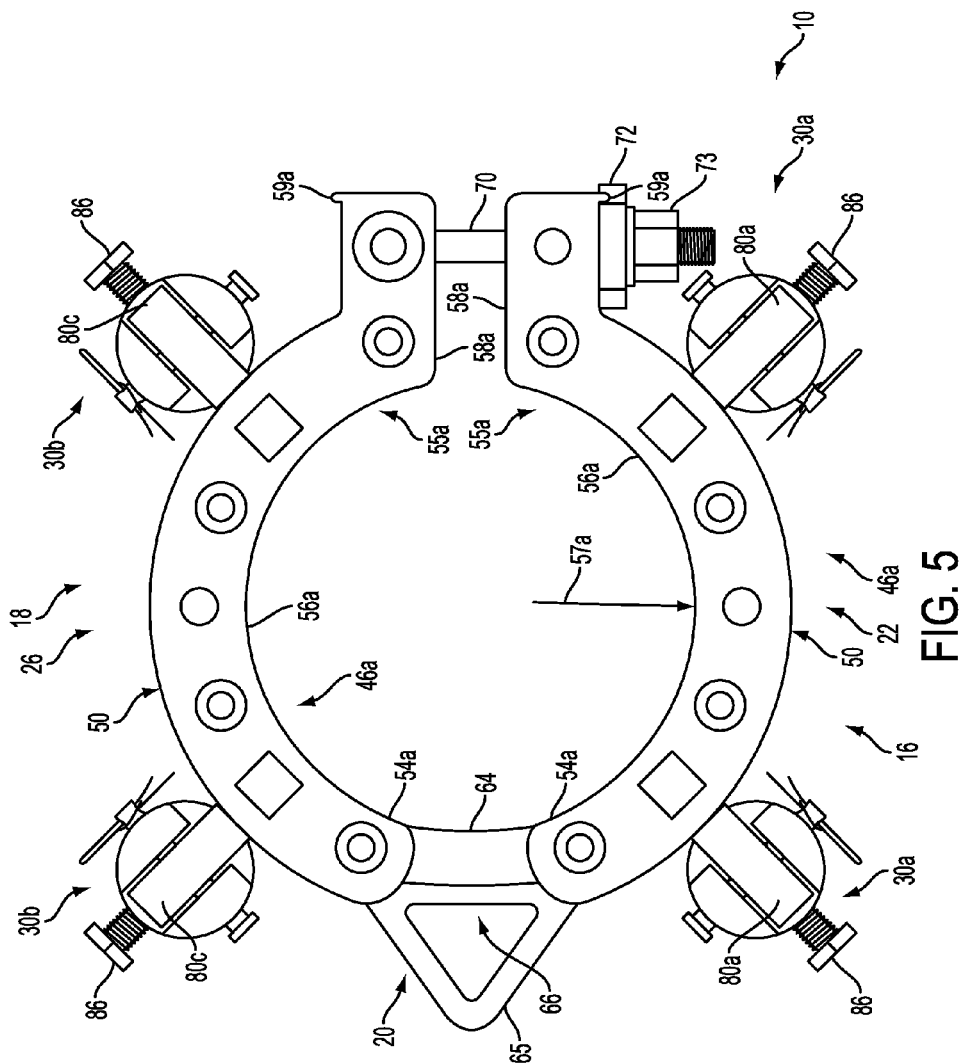
FIG. 5 is an end view of the apparatus in a closed position as depicted in FIG. 4.
Figure 6:
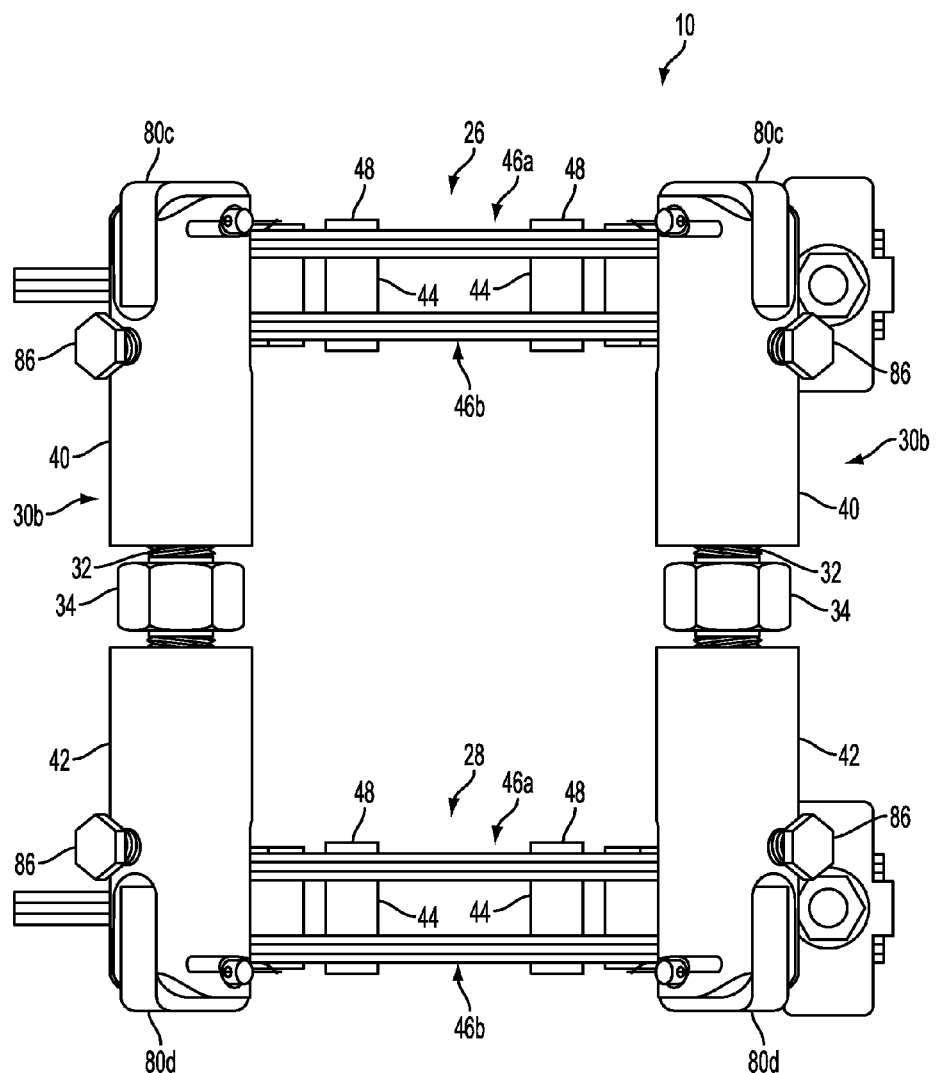
FIG. 6 is an elevation view of the apparatus in a closed position as shown in FIG. 4, and depicts a longitudinal spacing between first and second clamp jaws of each one of a first clamp member and a second clamp member of the apparatus, and further depicting the spacing between turnbuckle assemblies of the apparatus.

In one embodiment, the apparatus 10 can include two of the first plurality of turnbuckle assemblies 30a and two of the turnbuckle assemblies 30b, as shown in FIGS. 3-5. Alternatively, one or both of the first plurality of turnbuckle assemblies 30a and the second plurality of turnbuckle assemblies 30b can include a single turnbuckle assembly 30, or more than two of the turnbuckle assemblies 30.

The apparatus 10 can include a plurality of circumferentially spaced spacers 44 (FIGS. 1, 2, 4 and 6), with each being attached to one of the first clamp member 16 and the second clamp member 18. Each of the spacers 44 can be cylindrical and can define a hollow interior that can be configured to receive a fastener. In other embodiments, spacers having other shapes can be attached to the first clamp member 16 and the second clamp member 18. Each one of the first clamp jaw 22 and the second clamp jaw 24 of the first clamp member 16, and each one of the first clamp jaw 26 and the second clamp jaw 28 of the second clamp member 18, can include a first frame 46a and a second frame 46b, which can be longitudinally spaced from the first frame 46a, for example, by at least two of the spacers 44. Each of the spacers 44 can be attached to each one of the first frame 46a and the second frame 46b, for example, with a respective one of a plurality of fasteners 48, which can be rivets, as shown in FIG. 4.

Each of the first frame 46a and the second frame 46b, of each one of the first clamp jaw 22 and the second clamp jaw 24 of the first clamp member 16, and each one of the first clamp jaw 26 and the second clamp jaw 28 of the second clamp member 18, can be constructed from a plurality of layered plates 50, or from a single plate or bar. Three plates 50 can be used for each of the first frame 46a and the second frame 46b, as shown in FIG. 7. In other embodiments, one or both of the first frame 46a and the second frame 46b, of each of the first clamp jaw 22 and the second clamp jaw 24 of the first clamp member 16, and the first clamp jaw 26 and the second clamp jaw 28 of the second clamp member 18, can be constructed of other numbers of layered plates. The use of layered plates can result in ease of manufacturing and the associated cost reduction. The plates 50 of the first frame 46a can be aligned with one another, and with each of the plates 50 of the second frame 46b, for each of the first clamp jaw 22, the first clamp jaw 26, the second clamp jaw 24, and the second clamp jaw 28, which facilitates the use of apparatus 10 with straight sections of pipe, for example the first section of pipe 12 or the second section of pipe 14 shown in FIG. 1.

Figure 9:
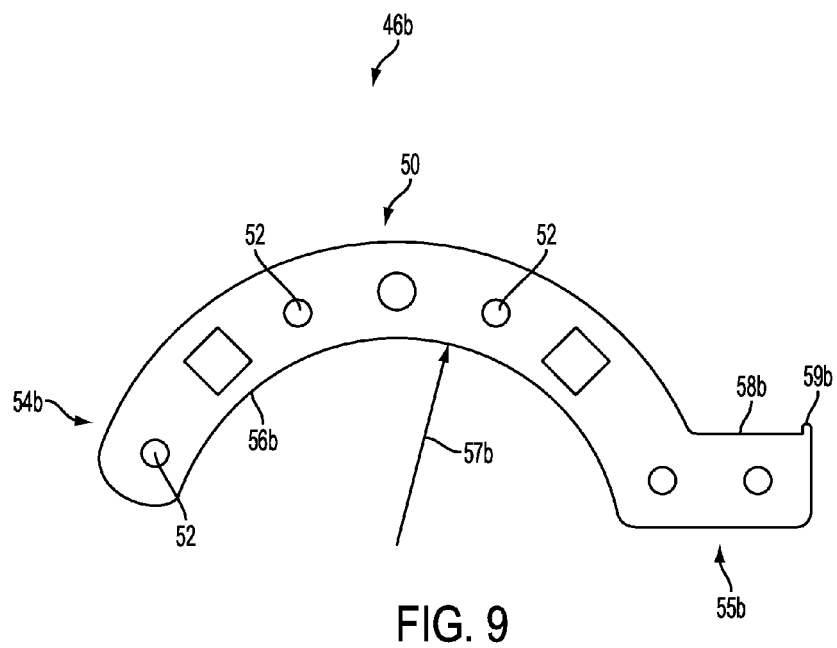
FIG. 9 is a plan view of a frame of one of the clamp jaws of the apparatus of FIG. 2.

Each plate 50 of each of the first frame 46a and the second frame 46b, for each of the first clamp jaw 22 and the second clamp jaw 24 of the first clamp member 16, and each of the first clamp jaw 26 and the second clamp jaw 28 of the second clamp member 18, can define a plurality of apertures, which can be circumferentially spaced. In one embodiment, as shown in FIG. 9 with respect to one of the plates 50 of one of the frames 46b, each plate 50 can define a plurality of apertures 52, which can be shaped to receive a fastener such as a rivet. In one embodiment, each of the apertures 52 can have a round shape. Each of the spacers 44 can be aligned with one of the apertures 52 in a respective one of the first frame 46a and the second frame 46b, to permit a fastener to pass through the first frame 46a, the spacer 44, and the second frame 46b, to attach the spacer 44 to each of the respective ones of the first frame 46a and the second frame 46b.

The first frame 46a of each one of the first clamp jaw 22 and the second clamp jaw 24 of the first clamp member 16, and the first clamp jaw 26 and the second clamp jaw 28 of the second clamp member 18, can include a first end 54a, a second end 55a circumferentially spaced from the first end 54a, and an inside surface 56a having a radius 57a (e.g., as shown in FIG. 3). The first frame 46a can extend arcuately from the first end 54a to the second end 55a. The radius 57a of the inside surface 56a can be at least substantially the same, i.e., the same or substantially the same, as the radius of the outside surface of the portion of the section of pipe that the first frame 46a surrounds. The second end 55a of the first frame 46a can include a radially outwardly extending portion 58a and an ear 59a extending transversely away from the radially outwardly extending portion 58a.

Referring to FIG. 9, the second frame 46b of each one of the first clamp jaw 22 and the second clamp jaw 24 of the first clamp member 16, and the first clamp jaw 26 and the second clamp jaw 28 of the second clamp member 18, can include a first end 54b, a second end 55b circumferentially spaced from the first end 54b, and an inside surface 56b having a radius 57b. The second frame 46b can extend arcuately from the first end 54b, to the second end 55b. The radius 57b of the inside surface 56b can be at least substantially the same, i.e., the same or substantially the same, as the radius of the outside surface of the portion of the section of pipe that the second frame 46b surrounds. The second end 55b of the second frame 46b can include a radially outwardly extending portion 58b and an ear 59b extending transversely away from the radially outwardly extending portion 58b. The configurations of the radially outwardly extending portions 58a and 58b, and the ears 59a and 59b, can facilitate clamping the first clamp member 16 to the second clamp member 18.

Figure 20:
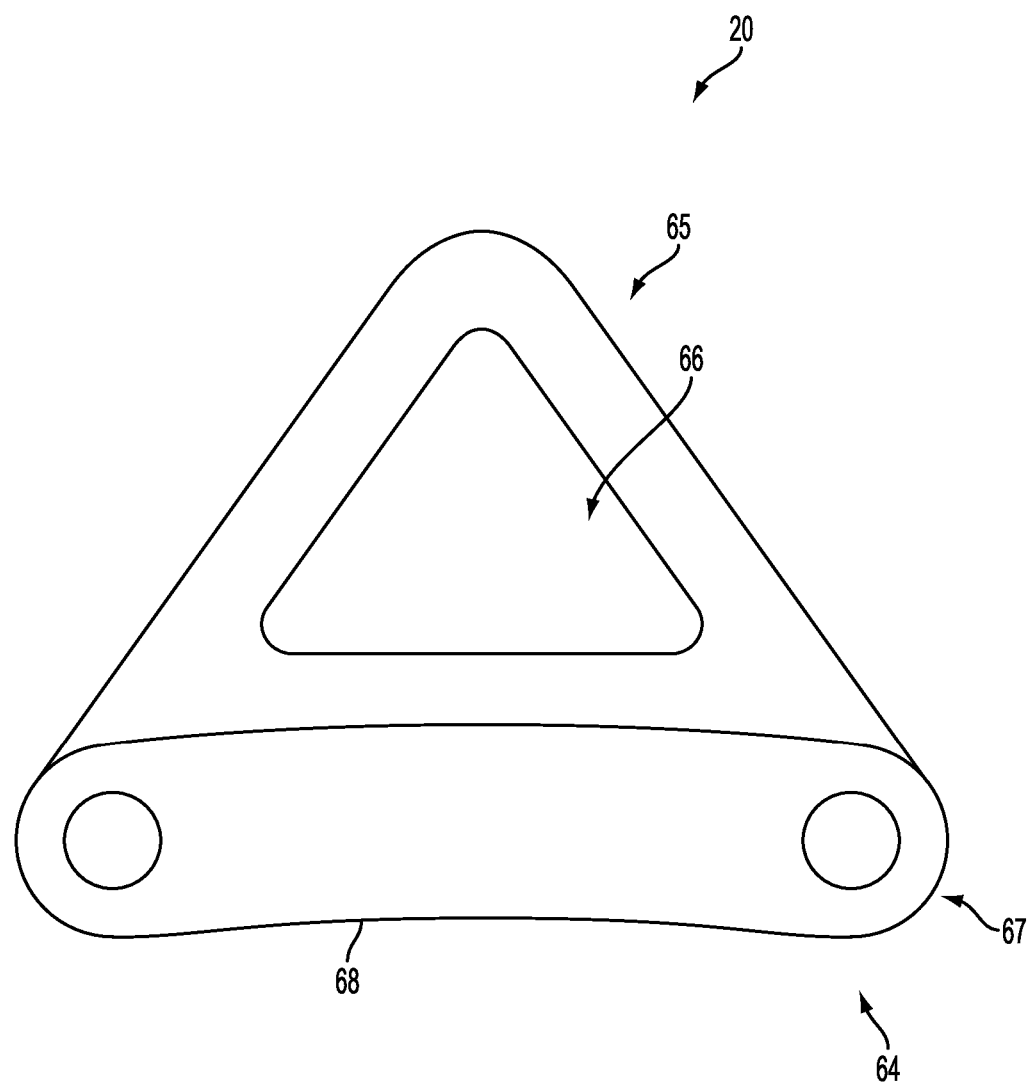
FIG. 20 is a plan view of a hinge according to one embodiment.
Figure 21:
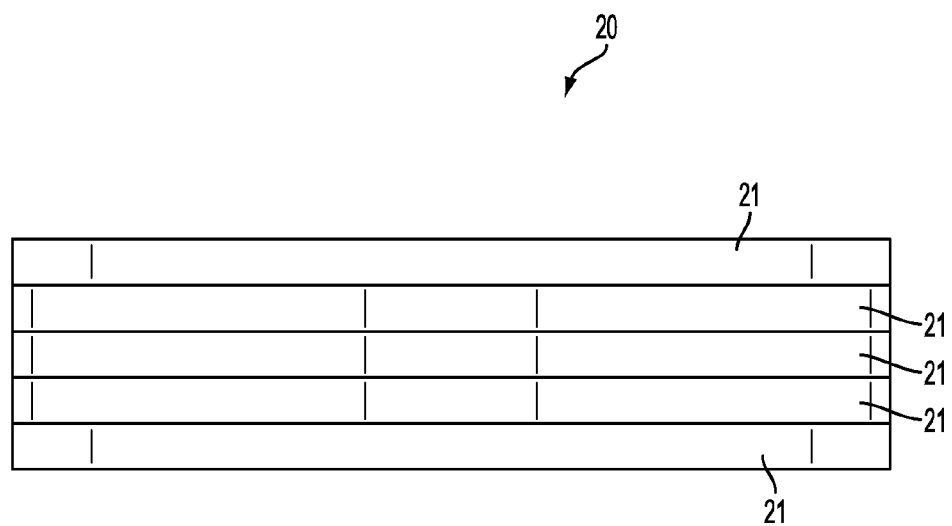
FIG. 21 is an elevation view of the hinge of FIG. 20.

Referring to FIGS. 3, 5 and 20, each of the hinges 20 can include an arcuate portion 64 and a flange portion 65 extending away from the arcuate portion 64. The flange portion 65 can have a generally triangular shape, which can define an aperture 66 that can be shaped and sized to receive a flexible member, for example, a cable, which can be used as a "tie-off", to prevent the apparatus 10 from inadvertently falling during assembly of the apparatus 10 to two adjacent sections of pipe. In other embodiments, the flange portion 65 can have any one of a variety of other shapes. In still other embodiments, the flange portion 65 can be omitted, for example, the hinge 20 shown in FIG. 2. Each of the hinges 20 can include an edge surface 67 (FIG. 20). At least an inside portion 68 of the edge surface 67 can be arcuate, and can be sized so that the hinges 20 do not contact the arcuate outside surfaces of the respective sections of pipe as the clamp members 16 and 18 pivot around the respective sections of pipe, for example the first section of pipe 12 and the second section of pipe 14 shown in FIG. 1. Accordingly, the clamp members 16 and 18 can pivot freely around the first section of pipe 12 and the second section of pipe 14. Each of the hinges 20 can be constructed from multiple layers of plates 21 made from a metal alloy or metal, which can enhance the ease of manufacturing and can reduce cost. Alternatively, each hinge 20 can be constructed as a unitary structure.

The arcuate portion 64 of one of the hinges 20 can be pivotally coupled with each of the first frame 46a and the second frame 46b of the first clamp jaw 22 of the first clamp member 16, and with each of the first frame 46a and the second frame 46b of the first clamp jaw 26 of the second clamp member 18. For example, one end of the arcuate portion 64 of the hinge 20 can be positioned within a space defined by the first frame 46a and the second frame 46b of the first clamp jaw 22 of the first clamp member 16, and pivotally coupled with each one of the first end 54a of the frame 46a, and the first end 54b of the frame 46b, of the first clamp jaw 22, using any suitable pivot member, e.g., rivets or clevis pins. The opposite end of the arcuate portion 64 of the hinge 20 can be similarly, pivotally coupled with each one of the first end 54a of the frame 46a, and the first end 54b of the frame 46b, of the first clamp jaw 26 of the second clamp member 18. The second hinge 20 can be similarly pivotally coupled with the second clamp jaw 24 of the first clamp member 16 and the second clamp jaw 28 of the second clamp member 18.

When the first clamp member 16 and the second clamp member 18 are positioned around respective portions of a first section of pipe and a second section of pipe, and each is in the closed position, the first clamp member 16 and the second clamp member 18 can be secured to one another. In one embodiment, the first clamp member 16 and the second clamp member 18 can be clamped to one another.

Apparatus 10 can include a pair of latch bolts 70 (FIGS. 4 and 7), which can be eye-bolts. One of the latch bolts 70 can be pivotally coupled with one of the first clamp jaw 26 of the second clamp member 18 (FIG. 4), and clamped to the first clamp jaw 22 of the first clamp member 16 (FIG. 4). The other latch bolt 70 can be pivotally coupled with the second clamp jaw 28 of the second clamp member 18 (FIG. 4), and clamped to the second clamp jaw 24 of the first clamp member 16 (FIG. 4).

As an example of the pivotal coupling of the latch bolts 70, the latch bolt 70 pivotally coupled with the second clamp jaw 28 of the second clamp member 18 can be pivotally coupled with the second end 55a of the first frame 46a, and the second end 55b of the second frame 46b, of the second clamp jaw 28, as shown in FIG. 2. This can be accomplished with a pivot member 71, which can be a pin. The pivot member 71 can be inserted through an aperture defined by the second end 55a of the first frame 46a, through an aperture defined by the latch bolt 70, and through an aperture defined by the second end 55b of the second frame 46b.

Figure 19:
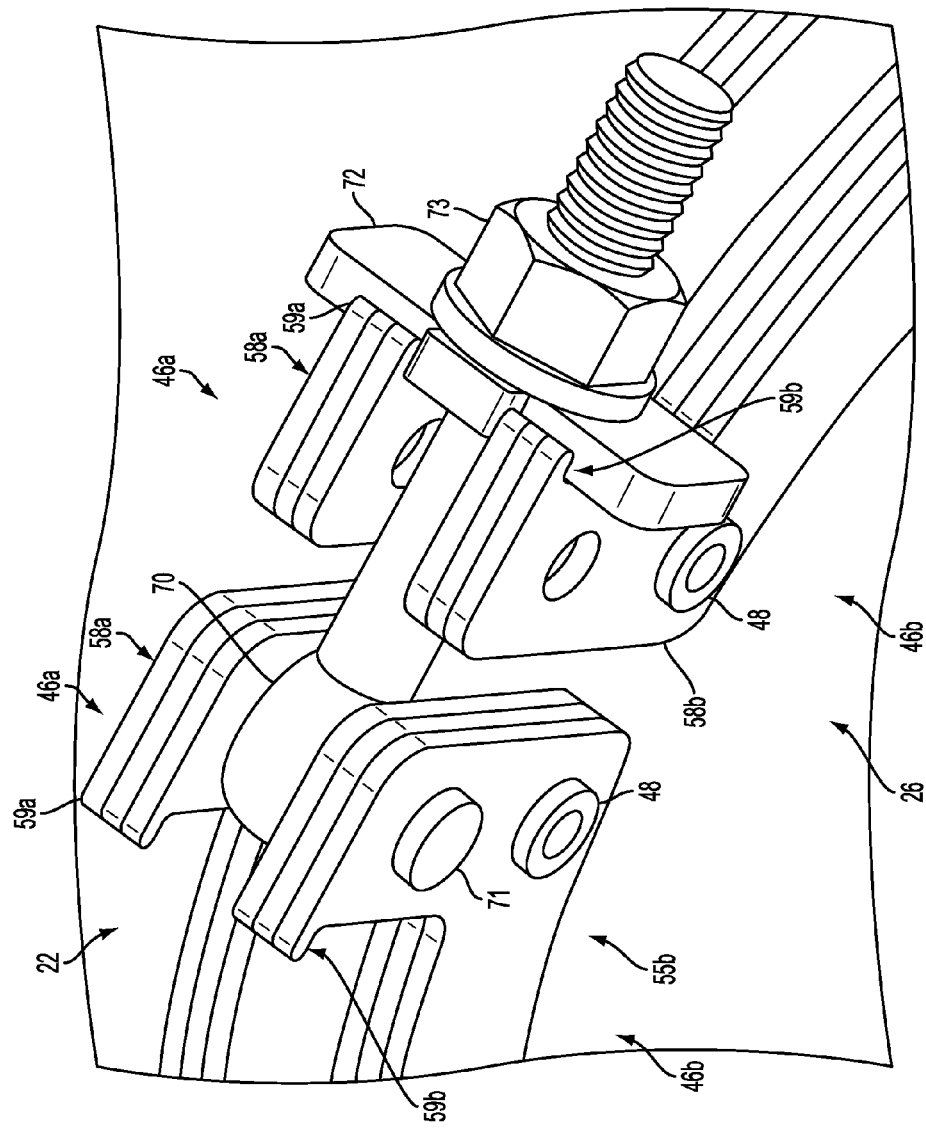
FIG. 19 is an enlarged, fragmentary perspective view depicting a portion of the apparatus of FIG. 2.

Apparatus 10 can include two latch plates 72, and one of the latch plates 72 can be retained on each of the latch bolts 70 by a latch bolt nut 73. In one embodiment, the latch bolt 70 pivotally coupled with the second clamp jaw 28 of the second clamp member 18 can be rotated to position the respective latch plate 72 against the outwardly extending portion 58a of the second end 55a of the first frame 46a, and against the outwardly extending portion 58b of the second end 55b of the second frame 46b, of the second clamp jaw 24 of the first clamp member 16. The nut 73 can then be tightened to clamp the second clamp jaw 24 of the first clamp member 16 to the second clamp jaw 28 of the second clamp member 18. The shape and size of the latch plate 72 can distribute the clamp load, or force, across the layered plates 50 of the first frame 46a and the second frame 46b of the second clamp jaw 24 of the first clamp member 16. The latch plate 72 can also provide a wear surface for the nut 73. The ear 59a of the second end 55a of the first frame 46a, and the ear 59b of the second end 55b of the second frame 46b, of the second clamp jaw 24, can facilitate retaining the latch plate 72 as the nut 73 is tightened. The latch bolt 70 pivotally coupled with the first clamp jaw 26 can be clamped to the first clamp jaw 22 in a similar manner. Alternatively, one of the latch bolts 70 can be pivotally coupled with the first clamp jaw 22 and clamped to the first clamp jaw 26, as shown in FIG. 19. Also, the other latch bolt 70 can alternatively be pivotally coupled with second clamp jaw 24 and clamped to the second clamp jaw 28.

Figure 13:
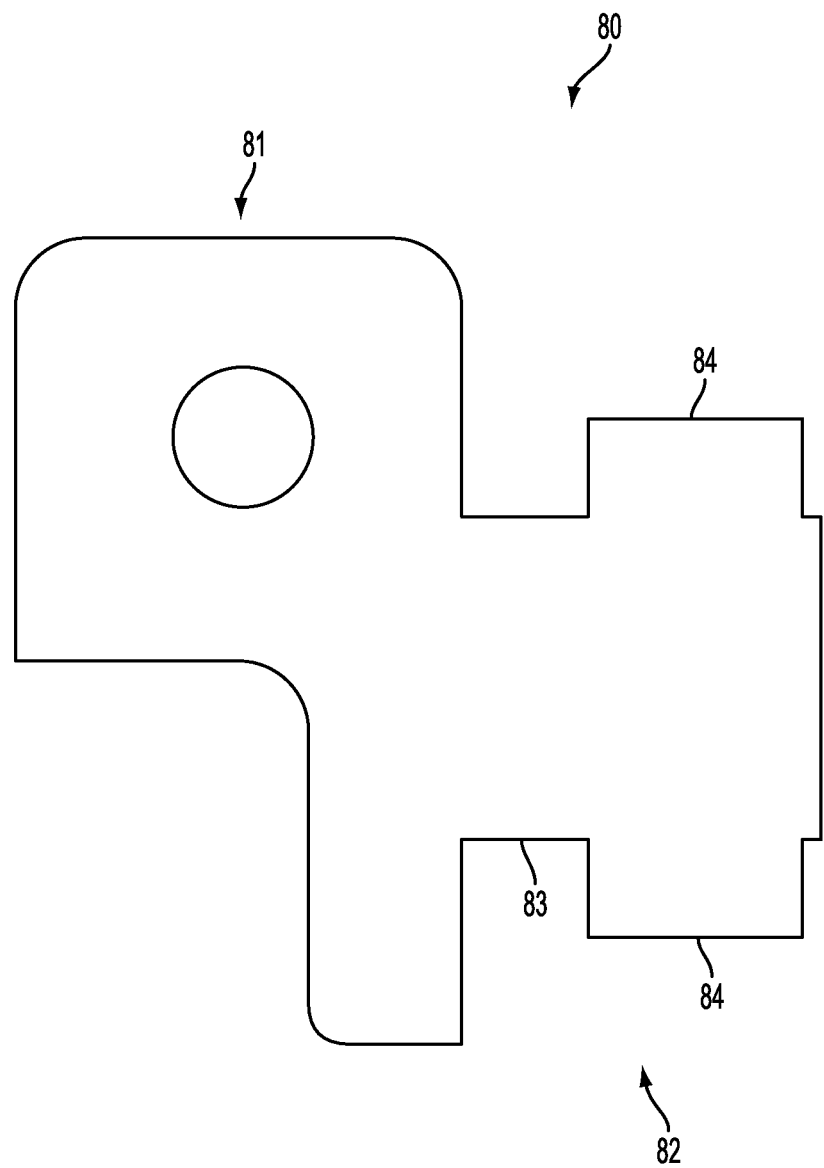
FIG. 13 is a plan view depicting a turnbuckle lug of the apparatus of FIG. 2.
Figure 14:
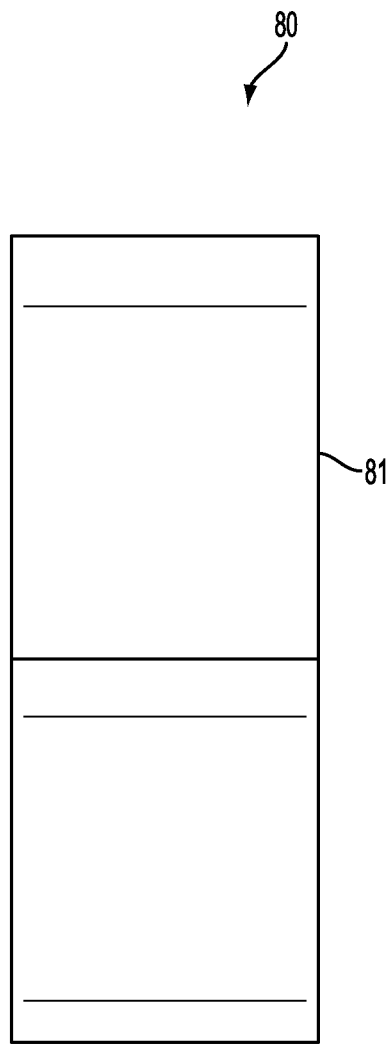
FIG. 14 is an elevation view depicting one end of the turnbuckle lug of FIG. 13.
Figure 15:
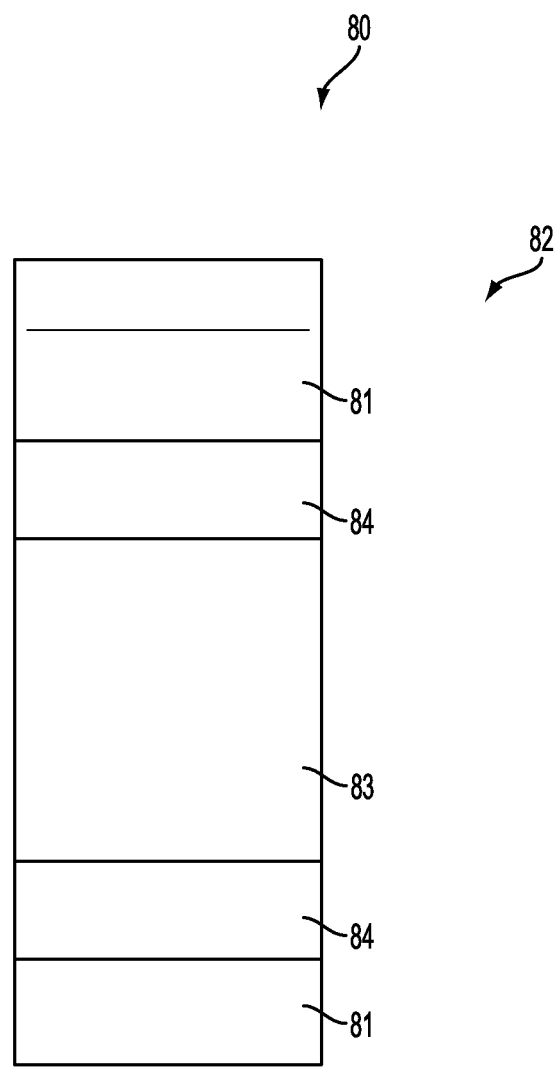
FIG. 15 is an elevation view depicting an opposite end of the turnbuckle lug of FIG. 13.
Figure 16:
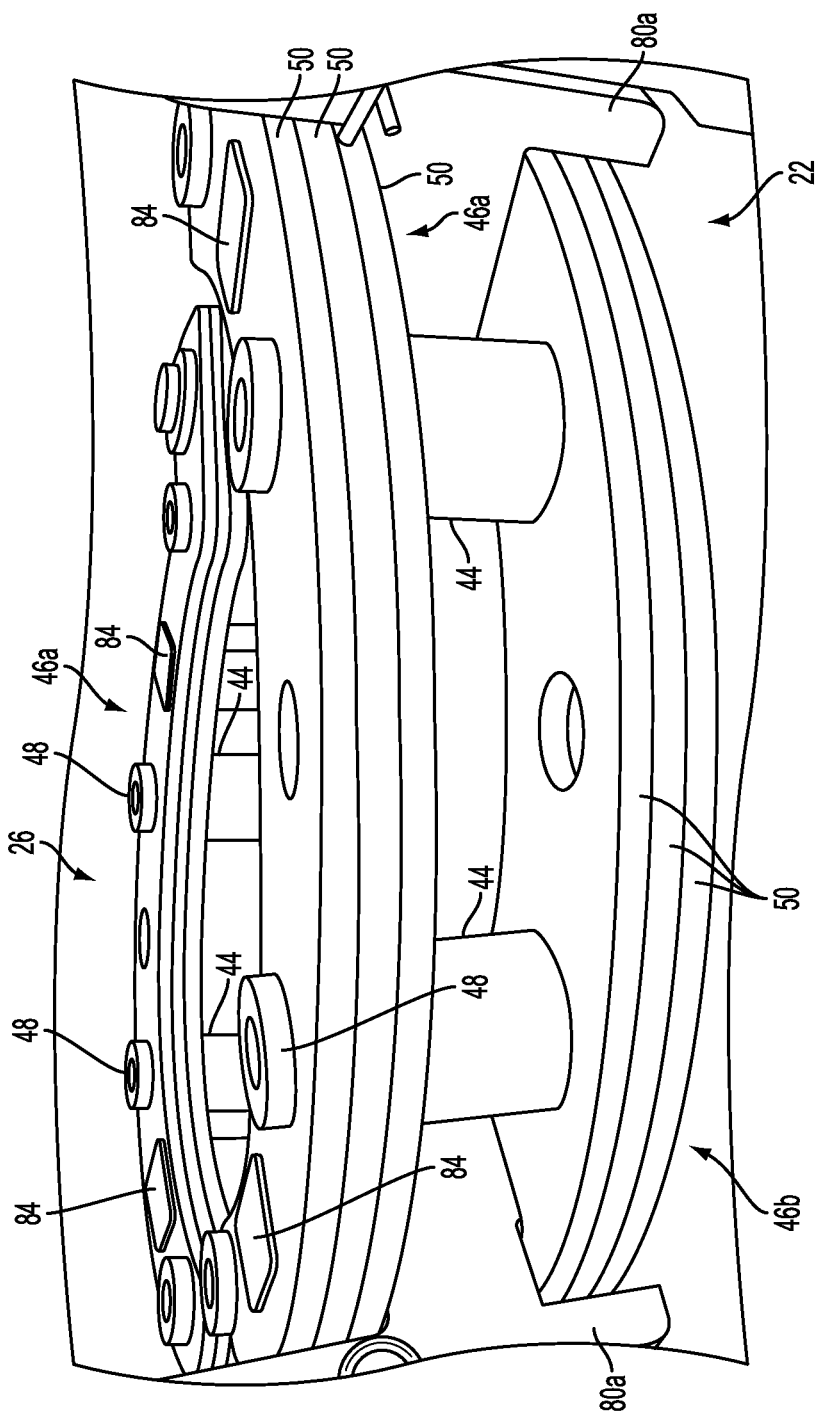
FIG. 16 is an enlarged, fragmentary perspective view of the apparatus of FIG. 2, depicting a plurality of spacers separating first and second frames of one of the clamp jaws of the apparatus.
Figure 17:
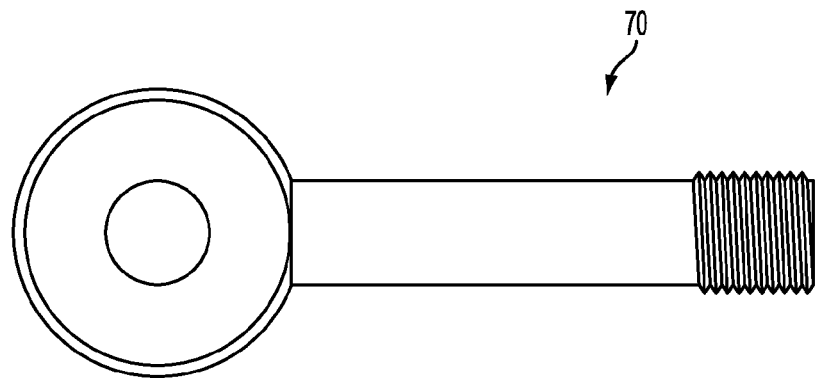
FIG. 17 is a plan view of a latch bolt of the apparatus of FIG. 2.
Figure 18:
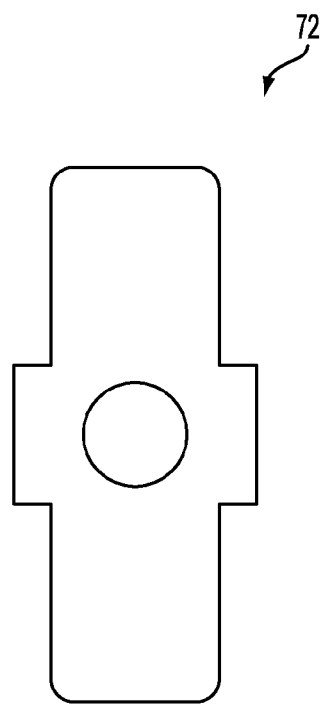
FIG. 18 is a plan view of a latch plate of the apparatus of FIG. 2.

Apparatus 10 can include a plurality of turnbuckle lugs 80 (FIGS. 13-15). Each of the turnbuckle lugs 80 can include a first portion 81 and a second portion 82 that can be integral with, and extend away from, the first portion 81. In one embodiment, the first portion 81 and the second portion 82 can be made as a unitary structure. The second portion of 82 of each of the turnbuckle lugs 80 can be generally T-shaped, and can include a rectangular insert 83 and a pair of posts 84, which can be integral with the insert 83 and can extend away from opposite sides of the insert 83. In one embodiment, each of the posts 84 can have a rectangular cross-sectional shape. Each one of the first clevis 40 and the second clevis 42 can define a slot that can be configured to receive the first portion 81 of a respective one of the lugs 80.

Referring to FIGS. 2 and 4, each one of a first plurality of the turnbuckle lugs, designated 80a, can couple a respective one of the first plurality of turnbuckle assemblies 30a with the first clamp jaw 22 of the first clamp member 16. In one embodiment, the first portion 81 of each one of the first plurality of turnbuckle lugs 80a can be pivotally coupled with the first clevis 40 of a respective one of the first plurality of turnbuckle assemblies 30a, and the second portion 82 of each one of the first plurality of turnbuckle lugs 80a can be fixed to the first clamp jaw 22 of the first clamp member 16.

Each one of a second plurality of the turnbuckle lugs, designated 80b, can couple a respective one of the first plurality of turnbuckle assemblies 30a with the second clamp jaw 24 of the first clamp member 16. In one embodiment, the first portion 81 of each one of the second plurality of turnbuckle lugs 80b can be pivotally coupled with the second clevis 42 of the first plurality of turnbuckle assemblies 30a, and the second portion 82 of each one of the second plurality of turnbuckle lugs 80b can be fixed to the second clamp jaw 24 of the first clamp member 16.

Each one of a third plurality of the turnbuckle lugs, designated 80c, can couple a respective one of the second plurality of turnbuckle assemblies 30b with the first clamp jaw 26 of the second clamp member 18. In one embodiment, the first portion 81 of each one of the third plurality of turnbuckle lugs 80c can be pivotally coupled with the first clevis 40 of a respective one of the second plurality of turnbuckle assemblies 30b, and the second portion 82 of each one of the third plurality of turnbuckle lugs 80c can be fixed to the first clamp jaw 26 of the second clamp member 18.

Each one of a fourth plurality of the turnbuckle lugs, designated 80d, can couple a respective one of the second plurality of turnbuckle assemblies 30b with the second clamp jaw 28 of the second clamp member 18. In one embodiment, the first portion 81 of each one of the fourth plurality of turnbuckle lugs 80d can be pivotally coupled with the second clevis 42 of a respective one of the second plurality of turnbuckle assemblies 30b, and the second portion 82 of each one of the fourth plurality of turnbuckle lugs 80d can be fixed to the second clamp jaw 28 of the second clamp member 18.

For each one of the first plurality of turnbuckle lugs 80a, the second plurality of turnbuckle lugs 80b, the third plurality of turnbuckle lugs 80c, and the fourth plurality of turnbuckle lugs 80d, one of the posts 84 can be positioned within an aperture defined by the first frame 46a of the respective clamp jaw, for example the first clamp jaw 22 of the first clamp member 16, and the other post 84 can be positioned within an aperture defined by the second frame 46b of the respective clamp jaw, for example, the first clamp jaw 22 of the first clamp member 16.

Each one of the first plurality of lugs 80a, the second plurality of lugs 80b, the third plurality of lugs 80c, and the fourth plurality of lugs 80d, can be pivotally coupled with the respective one of the first plurality of turnbuckle assemblies 30a and the second plurality of turnbuckle assemblies 30b, using clevis pins, or by any other suitable pivot structure. Clevis pins can enhance the speed and ease of assembly by a work crew.

Referring to FIGS. 1-8, apparatus 10 can include a plurality of threaded members 86, which can be bolts, which can be used to provide further adjustment, or fine turning, of the alignment of two sections of pipe, for example the first section of pipe 12 and the second section of pipe 14 shown in FIG. 1. Each of the threaded members 86 can be threaded through an aperture 87 defined by a respective one of the first clevis 40 and the second clevis 42 of a respective one of the turnbuckle assemblies 30, at a location that can be longitudinally spaced from a threaded bore 45 in the first clevis 40, and from a threaded bore 47 in the second clevis 42, which receive the rod 32.

For example, for each of the first plurality of turnbuckle assemblies 30a, a threaded member 86 can be threaded into and through the aperture 87 defined by the first clevis 40 and into contact with the first portion 81 of a respective one of the first plurality of turnbuckle lugs 80a. Another threaded member 86 can be threaded into and through the aperture 87 defined by the second clevis 42, and into contact with the first portion 81 of a respective one of the second plurality of turnbuckle lugs 80b. Further rotation of the threaded members 86 can cause the turnbuckle lugs 80a and 80b to force the respective one of the first clamp jaw 22 and the second clamp jaw 24 to pivot inwardly. This can cause the respective sections of pipe to move laterally, to provide further adjustment to the alignment of two sections of pipe, for example, the first section of pipe 12 and the second section of pipe 14.

Selective operation of all of the threaded members 86 can result in a fine tuning of the lateral alignment of two sections of pipe. Also, selective operation of the threaded members 86 can vary the orientations of the opposing end faces of the two sections of pipe, between an angular orientation and a parallel orientation within certain limitations, for example the limitations of movement of the turnbuckle assembles 30, and within limits determined by the requirements of the particular installation.

The adjustment of the lateral positions of the sections of pipe with the threaded members 86 can result in significant forces being applied to the respective ones of the turnbuckle assemblies 30. However, the turnbuckle assemblies 30 can be sized and configured to minimize the resultant stresses. For example, the threaded members 86 can extend transversely through a solid portion 41, 43 of the respective clevis 40, 42, of the respective turnbuckle assembly 30. Each of the solid portions 41 and 43 can have a significantly larger cross-sectional area than the rods 32 of the turnbuckle assemblies 30. The smallest cross-sectional area of each turnbuckle assembly 30 can be the cross-sectional area of each of the exposed portions of the rod 32, i.e., the portions of the rod 32 positioned between the torquing member 34 and the first clevis 40, and between the torquing member 34 and the second clevis 42. Clevis 40 has a length L1 and clevis 42 has a length L2 (FIG. 11). The length L1 of the clevis 40 and the length L2 of the clevis 42 can be sized so that the interfaces between the torquing member 34 and the exposed portions of the rod 32, as well as the interfaces between each of the clevises 40, 42 and the exposed portions of the rod 32, can be sufficiently spaced longitudinally from the threaded members 86.

In one embodiment, for each one of the first plurality of turnbuckle assemblies 30a and each one of the second plurality of turnbuckle assemblies 30b, the torquing member 34 can include a first end surface 88 and a second end surface 89 spaced from the first end surface 88 by a first distance D1 (FIG. 11). The first end surface 88 can be spaced from the first clevis 40 by a second distance D2 (FIG. 10) and the second end surface 89 can be spaced from the second clevis 42 by a third distance D3 (FIG. 10). The length L1 of the first clevis 40 and the length L2 of the second clevis 42 can each be greater than each one of the first distance D1, the second distance D2, and the third distance D3. Additionally, the torquing member 34 can be positioned at least substantially midway, i.e., midway or substantially midway, between the first clevis 40 and the second clevis 42.

Figure 22:
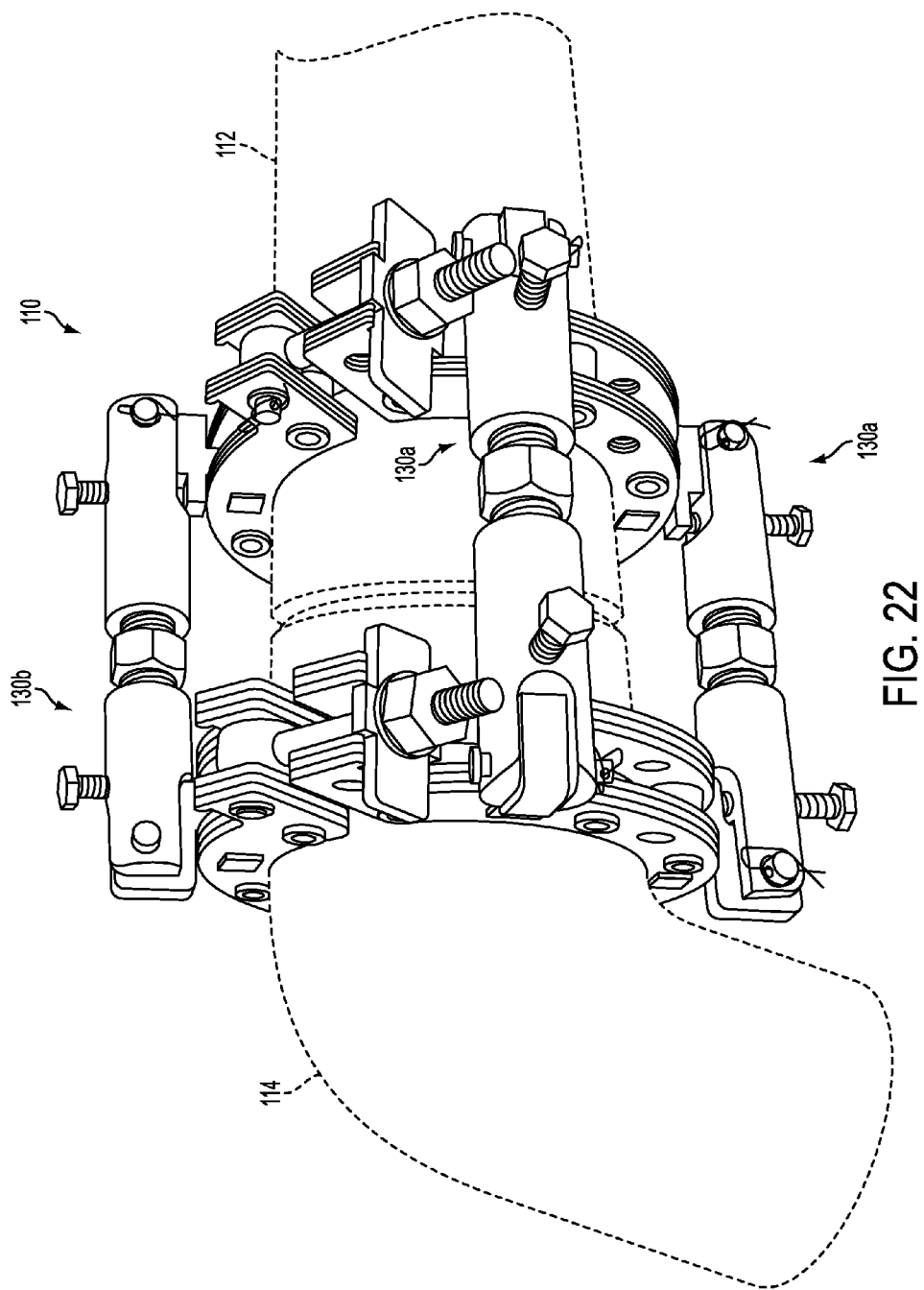
FIG. 22 is a perspective view of an apparatus for aligning sections of pipe according to another embodiment, with the apparatus being depicted in a closed position and in association with a first, straight section of pipe and a second, L-shaped section of pipe.

FIGS. 22-25 illustrate an apparatus 110 for aligning sections of pipe according to another embodiment. FIG. 22 illustrates the apparatus 110 in association with a straight section of pipe 112 and an L-shaped section of pipe 114. The apparatus 110 can include a first clamp member 116 and a second clamp member 118, which can be clamped together when the first clamp member 116 and the second clamp member 118 are in their respective closed positions, in surrounding and contacting relationship with respective portions of the first section of pipe 112 and the second section of pipe 114.

The first clamp member 116 can include a first clamp jaw 122 and a second clamp jaw 124 longitudinally spaced from the first clamp jaw 122. The second clamp member 118 can include a first clamp jaw 126 and a second clamp jaw 128 longitudinally spaced from the first clamp jaw 126. Apparatus 110 can include a first plurality of turnbuckle assemblies 130a, which can be coupled with each one of the first clamp jaw 122 and the second clamp jaw 124 of the first clamp member 116. Apparatus 110 can also include a second plurality of turnbuckle assemblies 130b, which can be coupled with each one of the first clamp jaw 126 and the second clamp jaw 128 of the second clamp member 118. Each of the first clamp jaw 122 and the second clamp jaw 124 of the first clamp member 116, and each of the first clamp jaw 126 and the second clamp jaw 128 of the second clamp member 118, can include a first frame 146a and a second frame 146b longitudinally spaced from the first frame 146a. Each of the frames 146a and 146b can include a plurality of layered plates 150. Each of the frames 146a can extend arcuately from a first end 154a to a second end 155a, and each of the second frames 146b can extend arcuately from a first end 154b to a second end 155b.

Figure 23:
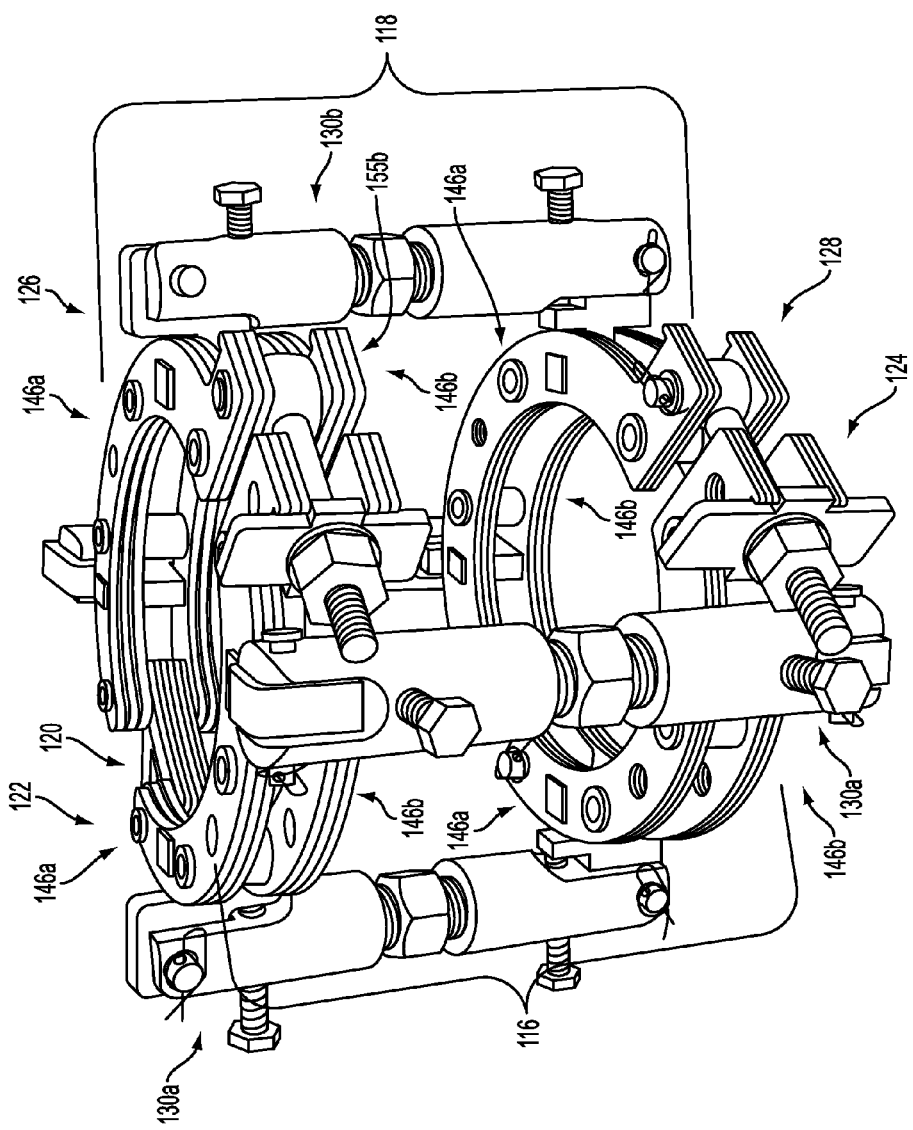
FIG. 23 is a perspective view of the apparatus of FIG. 22, with the apparatus in a closed position, but with the apparatus being depicted in an upright orientation, rather than a horizontal orientation for purposes of illustration.
Figure 24:
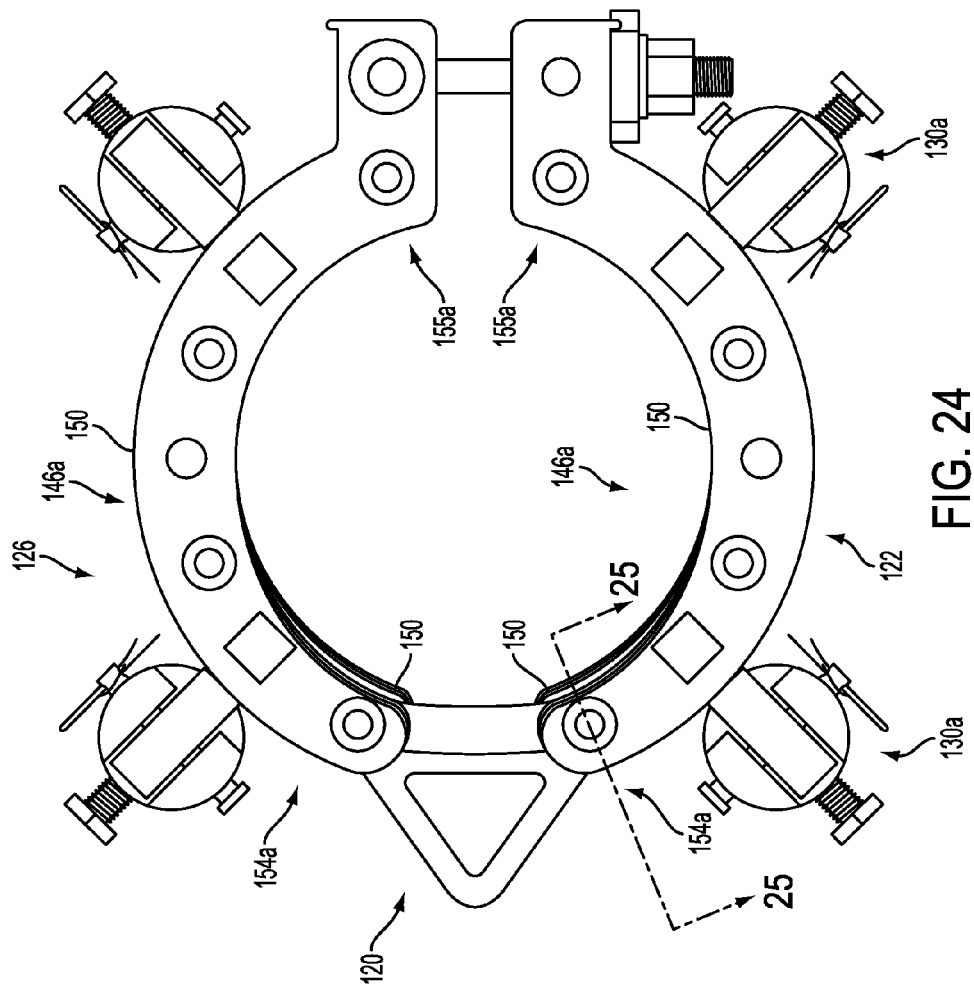
FIG. 24 is a plan view of the apparatus of FIG. 23.
Figure 25:
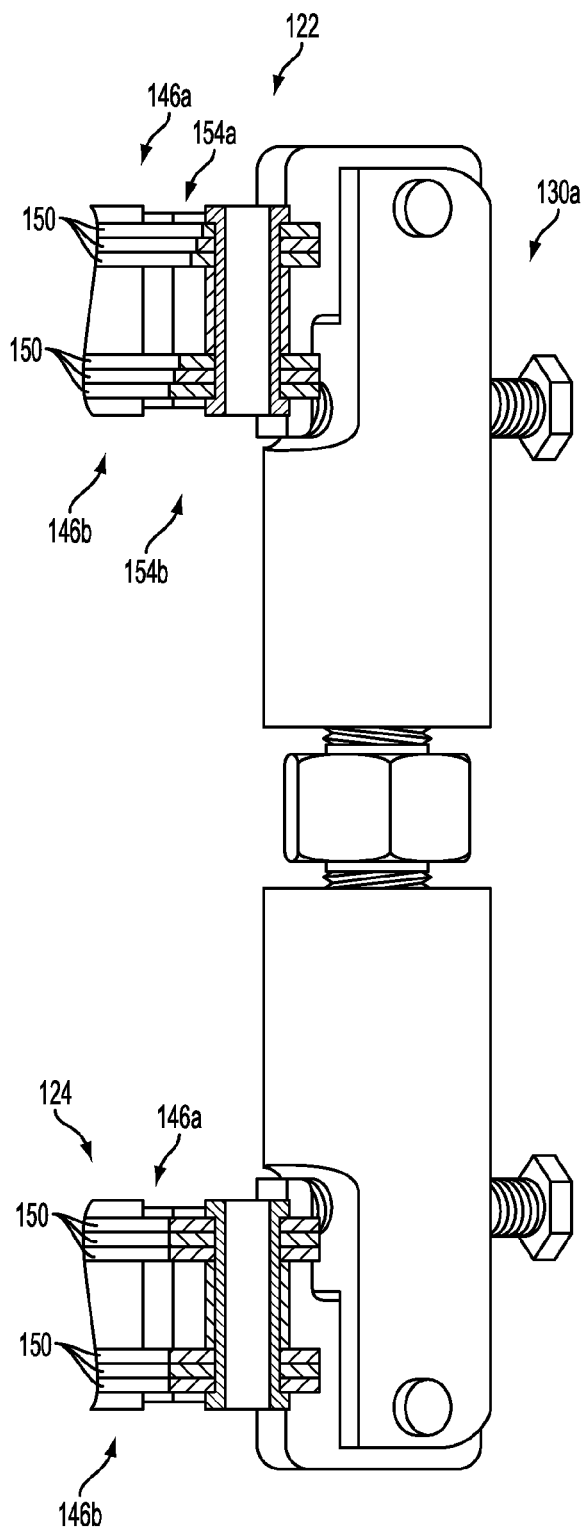
FIG. 25 is a cross-sectional view taken along line 25-25 in FIG. 24.

The plates 150 of the frames 146a and 146b of one or more of the first clamp jaw 122 of the first clamp member 116, the second clamp jaw 124 of the first clamp member 116, the first clamp jaw 126 of the second clamp member 118, and the second clamp jaw 128 of the second clamp member 118, can be configured to accommodate the shape of the L-shaped section of pipe 114. For example, in one embodiment, the plates 150 of each of the frames 146a and 146b of the first clamp jaw 122 of the first clamp member 116, and the plates 150 of each of the frames 146a and 146b of the first clamp jaw 126 of the second clamp member 118, can be offset relative to one another, as shown in FIGS. 24 and 25. Referring to FIGS. 23-25, each of the plates 150 of the first frame 146a of the first clamp jaw 122, and each of the plates 150 of the first frame 146a of the first clamp jaw 126, can taper, or reduce in width, from the second end 155a to the first end 154a, by varying amounts. Similarly, each of the plates 150 of the second frame 146b of the first clamp jaw 122, and each of the plates 150 of the second frame 146b of the first clamp jaw 126, can taper, or reduce in width, from the second end 155b to the first end 154b, by varying amounts.

Apparatus 110 can include two hinges 120, which can hingedly couple the first clamp member 116 with the second clamp member 118. The two hinges 120 can have different colors, for ease of identification of the apparatus 110, which can facilitate a worker in selecting the desired apparatus for a particular application. The components and configuration of the apparatus 110 can otherwise be the same as, or similar to, the components and configuration of apparatus 10.

FIGS. 26-29 illustrate a shoe insert 90 according to one embodiment. An assembly can be made from a kit of components that can include a plurality of the shoe inserts 90, of a variety of sizes. In one embodiment, the assembly can include the apparatus 10 and two pairs of the shoe inserts 90 coupled with the apparatus 10, to adapt apparatus 10 for use with two adjacent sections of pipe, which each have a smaller outside diameter than the outside diameter of pipes that the frames 46a and 46b of apparatus 10 are sized to engage.

Each shoe insert 90 can include an arcuate portion 91 and a flange portion 92, which can be attached to the arcuate portion 91. The arcuate portion 91 can include a plurality of arcuate plates 93, which can be attached to one another with one or more conventional fasteners 75, for example, rivets or mating bolts and nuts. Each of the arcuate plates 93 can include an inside surface 94 that has a radius 95. The radius 95 can be smaller than a radius 57a of an inside surface 56a of each of the frames 46a of apparatus 10, and can be smaller than a radius 57b of an inside surface 56b of each of the frames 46b of the apparatus 10.

Figure 26:
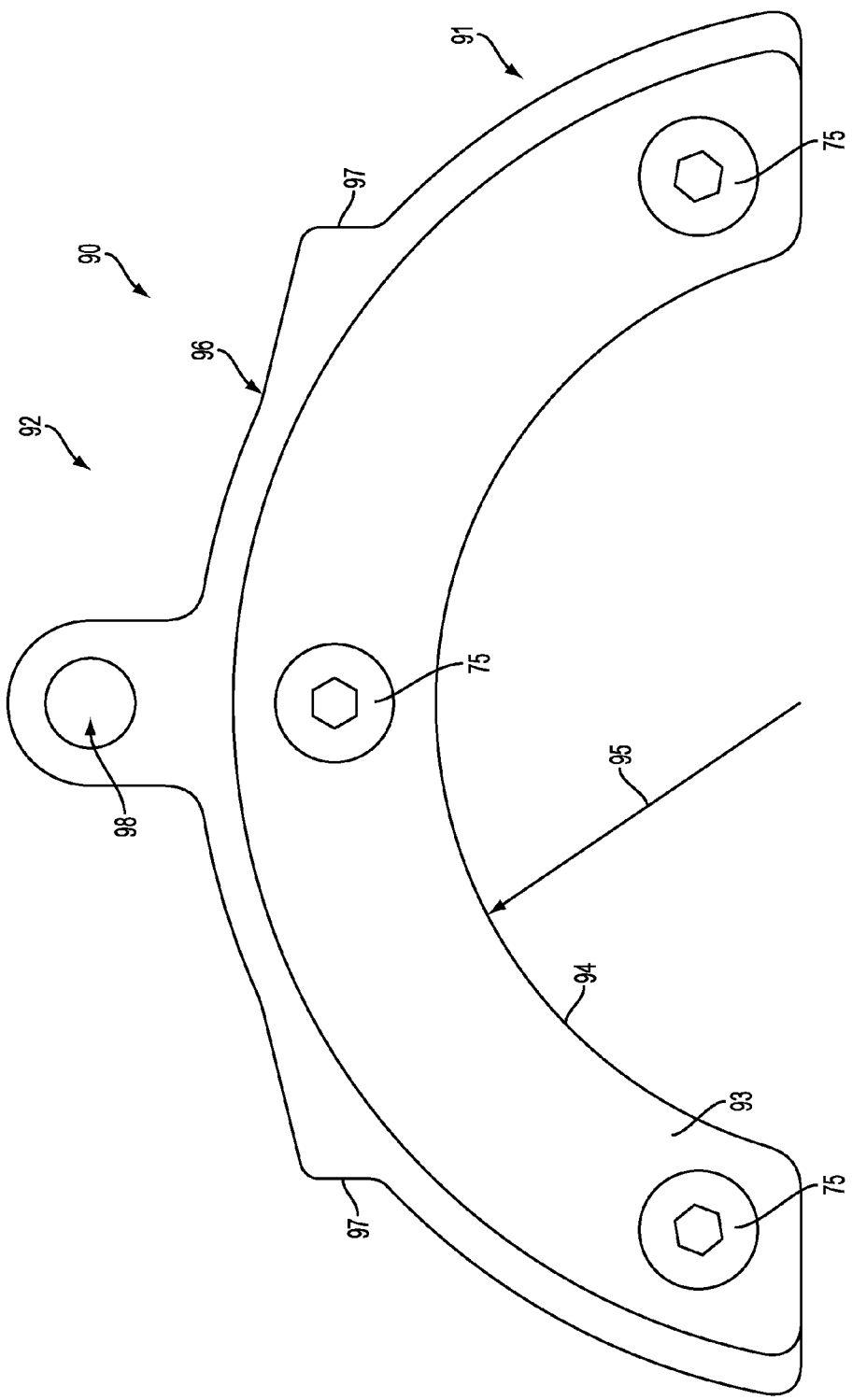
FIG. 26 is a plan view of a shoe insert according to one embodiment.
Figure 27:
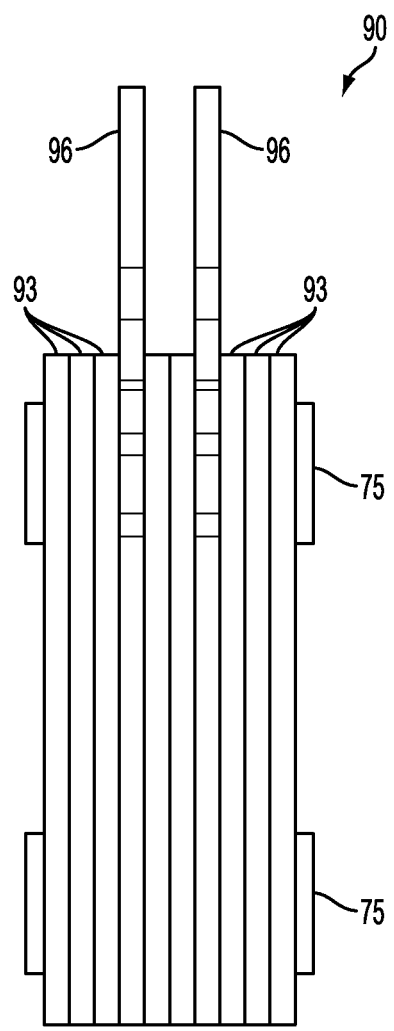
FIG. 27 is an elevation view depicting the shoe insert of FIG. 26.
Figure 28:
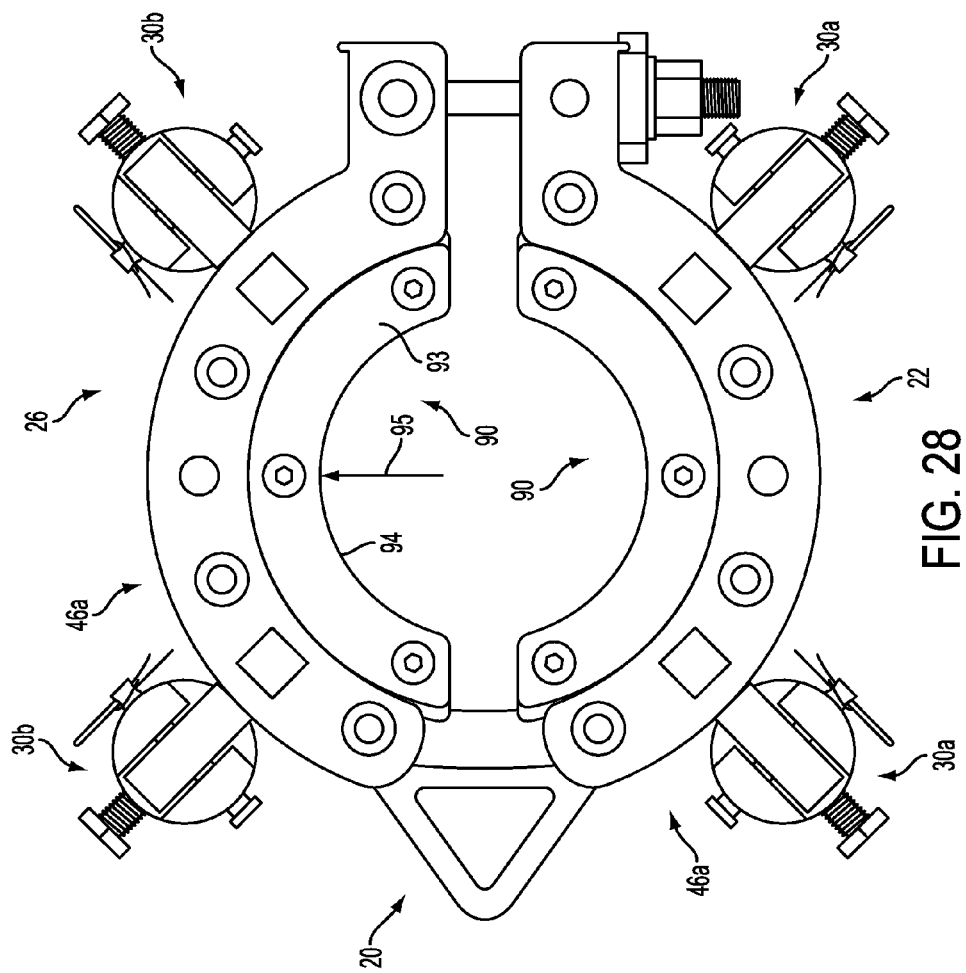
FIG. 28 is a plan view depicting a pair of the shoe inserts of FIG. 26 coupled with the apparatus of FIG. 23.
Figure 29:
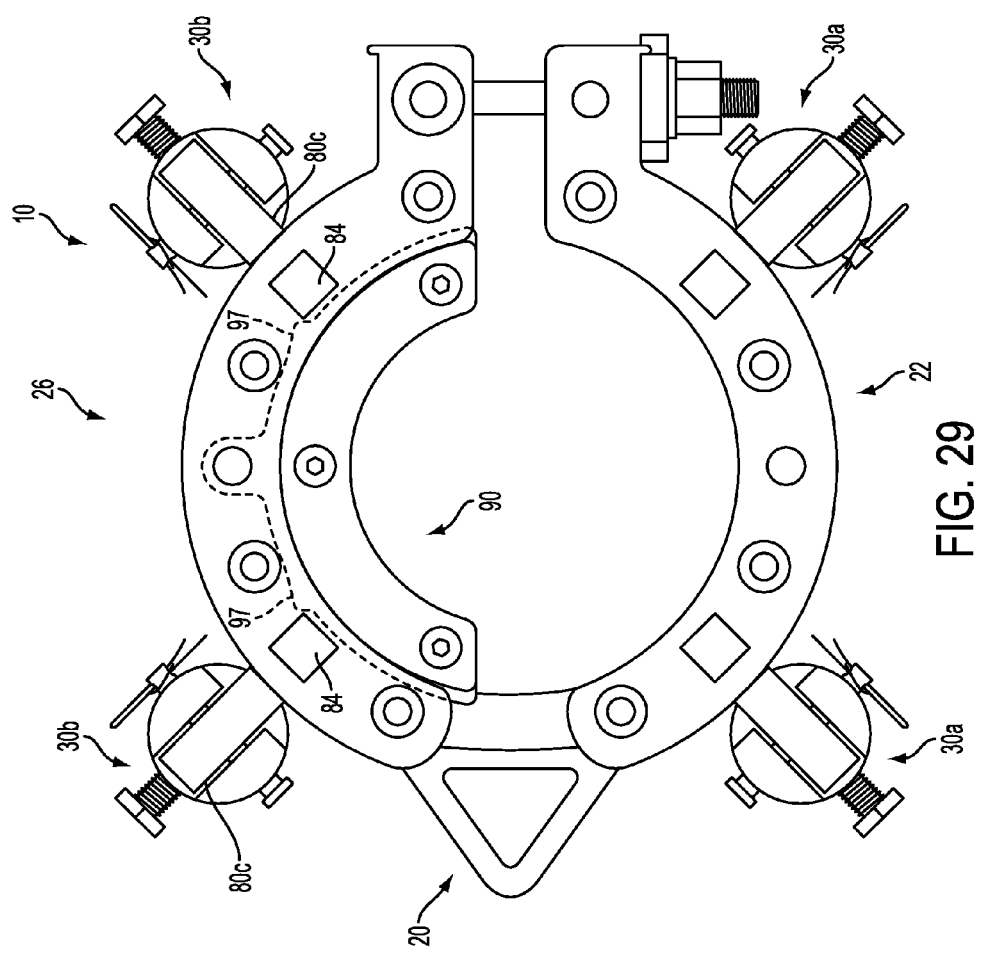
FIG. 29 is a plan view similar to FIG. 28, but with one of the shoe inserts omitted, depicting the association of each shoulder of the shoe insert with a post of a respective turnbuckle lug.

The flange portion 92 can include a plurality of flange plates 96, which can be spaced as shown in FIG. 27. The flange plates 96 can be attached to each other, and to the arcuate plates 93, using one or more of the conventional fasteners 75. Each flange plate 96 can include a pair of shoulders 97, and can define an aperture 98 (FIG. 26). Each shoe insert 90 can be coupled with the apparatus 10 by aligning the aperture 98 with apertures defined by respective ones of the frames 46a and 46b, and inserting any suitable fastener, e.g., a pin or bolt, which can be secured, e.g., with a clip or nut, respectively, so that the fastener can be removed easily. When each of the shoe inserts 90 is coupled with apparatus 10, each of the shoulders 97 of each shoe insert 90 can cooperate with a respective one of the turnbuckle lugs 80, for example, the second portion 82 of the respective one of the turnbuckle lugs 80, to at least inhibit, i.e., prevent or inhibit, rotation of the shoe insert 90.

The apparatus for aligning sections of pipe (e.g., 10, 110) can be used to quickly and accurately position the ends of adjacent sections of pipe in optimum relation for welding, or otherwise joining, the sections of pipe to form a continuous pipe. Accordingly, the apparatus (e.g., 10, 110) can facilitate the rapid construction of pipelines for the conveyance of gases or liquids. One application of the apparatus (e.g., 10, 110) is to align adjacent sections of pipe that may be imperfect due to minor variances in the outside diameter of one or both of the pipe sections to be joined.

Apparatus 10 can be advantageously used to align two straight sections of pipe, while apparatus 110 can be advantageously used to align a straight section of pipe with an L-shaped section of pipe. In other embodiments, apparatus according to the inventive principles can be advantageously used to align other combinations of straight, L-shaped, and T-shaped sections of pipe.

The apparatus (e.g., 10, 110) can be used to adjust the relative positions of adjacent sections of pipe both longitudinally and laterally, or transversely. Also, within certain limitations, the apparatus (e.g., 10, 110) can be used to vary the orientations of the opposing end faces of the two adjacent sections of pipe, between an angular orientation and a parallel orientation. These and other advantages will be described with regard to apparatus 10 for purposes of illustration and not of limitation.

The first clamp member 16 and the second clamp member 18, can be hingedly coupled, with each being pivotally coupled with a pair of hinges (e.g., 20), which facilitates positioning apparatus 10 in surrounding relationship with the two sections of pipe to be joined. Once apparatus 10 is in position, the first clamp member 16 can be clamped to the second clamp member 18 so that each of the clamp members 16, 18 engages each section of pipe to be joined. This can securely hold the two sections of pipe during the welding process, which can enhance the accuracy of the weld.

The relative longitudinal positions of two adjacent sections of pipe can be accurately and easily adjusted using turnbuckle assemblies (e.g., 30). Each of the first clamp jaw 22 of the first clamp member 16 and the first clamp jaw 26 of the second clamp member 18, can partially surround, and be forced against, respective portions of a first section of pipe. Each of the second clamp jaw 24 of the first clamp member 16 and the second clamp jaw 28 of the second clamp member 18, can partially surround, and be forced against, respective portions of a second section of pipe. A first plurality of the turnbuckle assemblies 30 (e.g., 30a) can be coupled with each one of, and can vary the longitudinal spacing between, the first clamp jaw 22 and the second clamp jaw 24 of the first clamp member 16. Similarly, a second plurality of the turnbuckle assemblies 30 (e.g., 30b) can be coupled with each one of, and can vary the longitudinal spacing between, the first clamp jaw 26 and the second clamp jaw 28 of the second clamp member 18. Accordingly, the first plurality of turnbuckle assemblies 30a and the second plurality of turnbuckle assemblies 30b can be adjusted, by rotating the respective torquing member 34 and rod 32, to accurately and easily adjust the longitudinal positions of the first and second sections of pipe.

The configuration of apparatus 10 can provide unobstructed access to the weld joint, which can enhance the accuracy and speed of the welding process. The unobstructed access results from the longitudinal spacing of the first clamp jaw 22 and the second clamp jaw 24 of the first clamp member 16, the longitudinal spacing of the first clamp jaw 26 and the second clamp jaw 28 of the second clamp member 18, the circumferential spacing of the first plurality of turnbuckle assemblies 30a along the first clamp member 16, and the circumferential spacing of the second plurality of turnbuckle assemblies 30b along the second clamp member 18.

The devises of the turnbuckle assemblies (e.g., 40, 42) can be color coded to facilitate coordinated adjustment of the turnbuckle assemblies by a work crew. For example, devises having a first color can be threaded onto a first portion of the respective rod 32 of the turnbuckle assembly 30, which has right-hand threads, and devises having a second, different color can be threaded onto a second portion of the rod 32, which has left-hand threads. In this manner, rotation of the rods 32 of each turnbuckle assembly 30 in a first direction can cause the first clamp jaw 22 to move away from the second clamp jaw 24, and can cause the first clamp jaw 26 to move away from the second clamp jaw 28, while rotation of the rod 32 of each turnbuckle assembly 30 in an opposite direction can cause the respective clamp jaws to move toward each other.

The relative lateral positions of two adjacent sections of pipe can be accurately and easily adjusted by selective operation of the threaded members 86 of apparatus 10, which can be bolts that may be referred to as "jack bolts". Each of the threaded members 86 can be threaded through one of the clevises (e.g., 40, 42) of the respective turnbuckle assembly 30 and into contacting engagement with one of the lugs 80 of apparatus 10, with further rotation of the threaded member 86 causing one of the clamp jaws of apparatus 10 to pivot inwardly, which in turn can cause one of the sections of pipe to move laterally. For example, rotation of the threaded members 86 that extend laterally, or transversely, through the clevis 40 of a corresponding one of the first plurality of turnbuckle assemblies 30a, and into engagement with a respective one of the turnbuckle lugs 80a, can cause the first clamp jaw 22 of the first clamp member 16 to pivot inwardly, which can cause lateral movement of the respective section of pipe.

As may be appreciated, use of the threaded members 86 to adjust the lateral positions of sections of pipe, can result in significant forces being applied to the respective turnbuckle assemblies 30. However, the turnbuckle assemblies 30 can be configured to minimize the resultant stress. For example, the threaded members 86 can extend transversely through a solid portion (e.g., 41, 43) of the clevis (e.g. 40, 42) of the respective turnbuckle assembly 30, which can have a significantly larger cross-sectional area than the rod 32 of the turnbuckle assembly 30. Also, the lengths of the devises (e.g., 40, 42) can be sized so that the interfaces between the torquing member 34 and the exposed portions of the rod 32, i.e., outside of the devises, as well as the interfaces between each of the clevises 40, 42 and the exposed portions of the rod 32, are sufficiently spaced longitudinally from the threaded members 86.

Each of the frames (e.g., 46a, 46b) of each of the clamp jaws (e.g., 22, 24) of the first clamp member 16, and each of the frames (e.g., 46a, 46b) of each of the clamp jaws (e.g., 26, 28) of the second clamp member 18, can be constructed from a plurality of plates 50, for example three plates 50 in one embodiment, which can enhance the ease of manufacturing and reduce cost. Similarly, each of the hinges 20 can be constructed from multiple plates, for example, two or more plates, which can also enhance the ease of manufacturing and reduce cost.

Piping is generally available in standard sizing throughout the industry. Accordingly, the apparatus for aligning sections of pipe (e.g., 10, 110) can be constructed to accommodate standard piping sizes. However, a pair of shoe inserts (e.g., 90) can be coupled with the apparatus (e.g., 10, 110) to adapt the apparatus (e.g., 10, 110) for use with a pipe having a smaller outside diameter. For example, the inside radius of each of the shoe inserts 90 can be smaller than the inside radius of the frames (e.g., 46a, 46b) of the first and second clamp jaws (e.g., 22, 24; and 26, 28) of the first and second clamp members (e.g., 16, 18) of the apparatus 10. The use of shoe inserts 90 to adapt the apparatus 10 for use with a smaller size pipe, can enable greater economy because a complete separate apparatus may no longer be needed for every size of pipe encountered. For example, a properly sized shoe insert 90 would allow the combination of the apparatus 10 and a pair of the shoe inserts 90 to be used with a pipe having a four inch outside diameter, instead of a pipe having a six inch outside diameter, without the need or use of another tool. A kit of parts including the apparatus (e.g., 10, 110) and shoe inserts (e.g., 90) having a variety of inside radiuses, can permit the use of the apparatus (e.g., 10, 110) with multiple pipes having different outside diameters.

While various embodiments of an apparatus for aligning sections of pipe, and an assembly made from a kit of components, have been described in considerable detail, it is not intended to restrict or in any way limit the scope of the appended claims to such detail. Additional modifications will be readily apparent to those skilled in the art.

I claim:

1. An apparatus for aligning sections of pipe, the apparatus comprising:
  a first clamp member comprising a first clamp jaw and a second clamp jaw longitudinally spaced from the first clamp jaw;
  a second clamp member comprising a first clamp jaw and a second clamp jaw longitudinally spaced from the first clamp jaw;
  a first hinge comprising an elongated portion having a first aperture and a second aperture wherein the first aperture is spaced apart from the second aperture;
  a first pivot member inserted through the first aperture of the first hinge and pivotally coupling the first hinge to the first clamp jaw of the first clamp member;
  a second pivot member inserted into the second aperture of the first hinge and pivotally coupling the first hinge to the first clamp jaw of the second clamp member;
  a second hinge comprising an elongated portion having a first aperture and a second aperture wherein the first aperture is spaced apart from the second aperture;
  a third pivot member inserted through the first aperture of the second hinge and pivotally coupling the second hinge to the second clamp jaw of the first clamp member;
  a fourth pivot member inserted into the second aperture of the second hinge and pivotally coupling the second hinge to the second clamp jaw of the second clamp member;
  a first plurality of turnbuckle assemblies, each one of the first plurality of turnbuckle assemblies being coupled with each one of, and adjustable to vary the longitudinal spacing between, the first clamp jaw and the second clamp jaw of the first clamp member; and
  a second plurality of turnbuckle assemblies, each one of the second plurality of turnbuckle assemblies being coupled with each one of, and adjustable to vary the longitudinal spacing between, the first clamp jaw and the second clamp jaw of the second clamp member.

2. The apparatus of claim 1, wherein:
  each one of the first clamp member and the second clamp member is pivotable between an open position and a closed position;
  the first clamp member is secured to the second clamp member when each one of the first clamp member and the second clamp member is in the respective closed position;
  each one of the first clamp jaw of the first clamp member and the first clamp jaw of the second clamp member is configured to surround and engage a respective portion of a first section of pipe when each one of the first clamp member and the second clamp member is in the respective closed position; and
  each one of the second clamp jaw of the first clamp member and the second clamp jaw of the second clamp member is configured to surround and engage a respective portion of a second section of pipe when each one of the first clamp member and the second clamp member is in the respective closed position.

3. The apparatus of claim 2, wherein:
  the first clamp member is clamped to the second clamp member when each one of the first clamp member and the second clamp member is in the respective closed position.

4. The apparatus of claim 2, wherein:
  the elongated portion of the first hinge comprises an edge surface, at least an inside portion of the edge surface of the first hinge being arcuate; and
  the elongated portion of the second hinge comprises an edge surface, at least an inside portion of the edge surface of the second hinge being arcuate.

5. The apparatus of claim 2, wherein:
  the elongated portion of the first hinge is arcuate;
  the first hinge further comprises a flange integral with, and extending away from, the elongated portion, the elongated portion and the flange defining an aperture;
  the elongated portion of the second hinge is arcuate;
  the second hinge further comprises a flange integral with, and extending away from, the elongated portion, the elongated portion and the flange defining an aperture.

6. The apparatus of claim 5, wherein:

the aperture formed by the elongated portion and the flange portion of the first hinge has a generally triangular shape.

7. The apparatus of claim 2, further comprising:

a plurality of turnbuckle lugs, each one of the turnbuckle lugs comprising a first portion and a second portion integral with the first portion; wherein each one of a first plurality of the turnbuckle lugs couples a respective one of the first plurality of turnbuckle assemblies with the first clamp jaw of the first clamp member;

each one of a second plurality of the turnbuckle lugs couples a respective one of the first plurality of turnbuckle assemblies with the second clamp jaw of the first clamp member;

each one of a third plurality of the turnbuckle lugs couples a respective one of the second plurality of turnbuckle assemblies with the first clamp jaw of the second clamp member; and each one of a fourth plurality of the turnbuckle lugs couples a respective one of the second plurality of turnbuckle assemblies with the second clamp jaw of the second clamp member.

8. The apparatus of claim 3, further comprising:

a pair of latch bolts; wherein each one of the latch bolts is pivotally coupled at one end to one of the first clamp member and the second clamp member, and is clamped at an opposite end to the other one of the first clamp member and second clamp member, when each one of the first clamp member and the second clamp member is in the respective closed position.

9. The apparatus of claim 7, wherein:

each one of the first plurality of turnbuckle assemblies comprises a rod, a torquing member secured to the rod, a first clevis threadedly engaged with a first portion of the rod, and a second clevis threadedly engaged with a second portion of the rod, the torquing member being positioned between the first clevis and the second clevis;

the first portion of each one of the first plurality of turnbuckle lugs is pivotally coupled with the first clevis of a respective one of the first plurality of turnbuckle assemblies, and the second portion of each one of the first plurality of turnbuckle lugs is fixed to the first clamp jaw of the first clamp member; and the first portion of each one of the second plurality of turnbuckle lugs is pivotally coupled with the second clevis of a respective one of the first plurality of turnbuckle assemblies, and the second portion of each one of the second plurality of turnbuckle lugs is fixed to the second clamp jaw of the first clamp member.

10. The apparatus of claim 9, wherein:

the first portion of each one of the third plurality of turnbuckle lugs is pivotally coupled with a first clevis of a respective one of the second plurality of turnbuckle assemblies, and the second portion of each one of the third plurality of turnbuckle lugs is fixed to the first clamp jaw of the second clamp member; and the first portion of each one of the fourth plurality of turnbuckle lugs is pivotally coupled with a second clevis of a respective one of the second plurality of turnbuckle assemblies, and the second portion of each one of the fourth plurality of turnbuckle lugs is fixed to the second clamp jaw of the second clamp member.

11. The apparatus of claim 1, wherein:

each one of the first plurality of turnbuckle assemblies and each one of the second plurality of turnbuckle assemblies comprises a rod and a torquing member secured to the respective rod, the rod comprising a first portion and a second portion, the torquing member being positioned between the first portion and the second portion of the rod;

each one of the first plurality of turnbuckle assemblies and each one of the second plurality of turnbuckle assemblies further comprises a first clevis and a second clevis, the first clevis having a first color, the second clevis having a second color different from the first color; and for each one of the first plurality of turnbuckle assemblies and each one of the second plurality of turnbuckle assemblies, the first clevis is threadedly engaged with the first portion of the rod, the second clevis is threadedly engaged with the second portion of the rod, and the torquing member is positioned between the first clevis and the second clevis.

12. The apparatus of claim 11, wherein:

for each one of the first plurality of turnbuckle assemblies, the first clevis having the first color is coupled with the first clamp jaw of the first clamp member and the second clevis having the second color is coupled with the second clamp jaw of the first clamp member; and for each one of the second plurality of turnbuckle assemblies, the first clevis having the first color is coupled with the first clamp jaw of the second clamp member and the second clevis having the second color is coupled with the second clamp jaw of the second clamp member.

13. The apparatus of claim 12, wherein:

for each one of the first plurality of turnbuckle assemblies and each one of the second plurality of the turnbuckle assemblies, the first portion of the rod comprises right-hand male threads and the second portion of the rod comprises left-hand male threads.

14. The apparatus of claim 12, wherein:

for each one of the first plurality of turnbuckle assemblies and each one of the second plurality of turnbuckle assemblies, the first portion of the rod comprises left-hand male threads and the second portion of the rod comprises right-hand male threads.

15. An apparatus for aligning sections of pipe, the apparatus comprising:

a first clamp member comprising a first clamp jaw and a second clamp jaw longitudinally spaced from the first clamp jaw;

a second clamp member hingedly coupled with the first clamp member, the second clamp member comprising a first clamp jaw and a second clamp jaw longitudinally spaced from the first clamp jaw; and a plurality of turnbuckle assemblies, each one of the turnbuckle assemblies comprising a rod and a torquing member secured to the rod, each one of the turnbuckle assemblies further comprising a first clevis and a second clevis, each one of the first clevis and the second clevis being threadedly engaged with the rod, wherein for each of the turnbuckle assemblies:

the first clevis and the second clevis each comprise a length;

the torquing member comprises a first end surface and a second end surface spaced from the first end surface by a first distance, the first end surface of the torquing member being spaced from the first clevis by a second distance, the second end surface of the torquing member being spaced from the second clevis by a third distance;

the length of each one of the first clevis and the second clevis is greater than each one of the first distance, the second distance, and the third distance;

each one of a first plurality of the turnbuckle assemblies is coupled with each one of, and is adjustable to vary the longitudinal spacing between, the first clamp jaw and the second clamp jaw of the first clamp member; and each one of a second plurality of the turnbuckle assemblies is coupled with each one of, and is adjustable to vary the longitudinal spacing between, the first clamp jaw and the second clamp jaw of the second clamp member.

16. The apparatus of claim 15, wherein, for each one of the turnbuckle assemblies:

the torquing member comprises a nut having a polygonal shape.

17. The apparatus of claim 16, wherein for each of the turnbuckle assemblies:

the nut is positioned midway between the first clevis and the second clevis.

18. The apparatus of claim 15, further comprising:

a first hinge, each one of the first clamp jaw of the first clamp member and the first clamp jaw of the second clamp member being pivotally coupled with the first hinge; and a second hinge, each one of the second clamp jaw of the first clamp member and the second clamp jaw of the second clamp member being pivotally coupled with the second hinge; wherein each one of the first clamp member and the second clamp member is pivotable between an open position and a closed position.

19. The apparatus of claim 18, wherein:

the first clamp member is clamped to the second clamp member when each one of the first clamp member and the second clamp member is in the respective closed position;

each one of the first clamp jaw of the first clamp member and the first clamp jaw of the second clamp member is configured to surround and engage a respective portion of a first section of pipe when each one of the first clamp member and the second clamp member is in the respective closed position; and each one of the second clamp jaw of the first clamp member and the second clamp jaw of the second clamp member is configured to surround and engage a respective portion of a second section of pipe when each one of the first clamp member and the second clamp member is in the respective closed position.

20. An apparatus for aligning sections of pipe, the apparatus comprising:

a first clamp member comprising a first clamp jaw and a second clamp jaw longitudinally spaced from the first clamp jaw;

a second clamp member hingedly coupled with the first clamp member, the second clamp member comprising a first clamp jaw and a second clamp jaw longitudinally spaced from the first clamp jaw;

a first plurality of turnbuckle assemblies, each being coupled with each one of the first clamp jaw and the second clamp jaw of the first clamp member;

a second plurality of turnbuckle assemblies, each being coupled with each one of the first clamp jaw and the second clamp jaw of the second clamp member; and a plurality of spacers; wherein each one of the first clamp jaw and the second clamp jaw of the first clamp member, and each one of the first clamp jaw and the second clamp jaw of the second clamp member, comprises a first frame and a second frame spaced from the first frame by at least a respective pair of the spacers, each one of the first frame and the second frame comprising a plurality of adjoining layered plates.

21. The apparatus of claim 20, wherein:

for each one of the first clamp jaw and the second clamp jaw of the first clamp member, and each one of the first clamp jaw and the second clamp jaw of the second clamp member, each one of the first frame and the second frame comprises a first end and a second end, with each one of the first frame and the second frame extending arcuately from the first end to the second end.

22. The apparatus of claim 21, wherein:

for each one of the second clamp jaw of the first clamp member and the second clamp jaw of the second clamp member, the respective layered plates of the first frame and the second frame are aligned with one another.

23. The apparatus of claim 22, wherein:

for each one of the first clamp jaw of the first clamp member and the first clamp jaw of the second clamp member, the respective layered plates of each one of the first frame and the second frame are aligned with one another.

24. The apparatus of claim 22, wherein:

for each one of the first clamp jaw of the first clamp member and the first clamp jaw of the second clamp member, the respective layered plates of the first frame and the second frame taper in width from the second end to the first end, with the first end having a reduced width, resulting in an offset among the layered plates at the first end, facilitating positioning of the apparatus around a first, straight section of pipe and a second, adjacent section of pipe having an L-shape.

25. The apparatus of claim 20, further comprising:

a plurality of turnbuckle lugs, each of the turnbuckle lugs comprising a first portion and a second portion integral with, and extending away from, the first portion; wherein for each one of a first plurality of the turnbuckle lugs, the first portion of the lug is coupled with a respective one of the first plurality of turnbuckle assemblies, and the second portion of the lug is positioned between, and coupled with, the first frame and the second frame of the first clamp jaw of the first clamp member;

for each one of a second plurality of the turnbuckle lugs, the first portion of the lug is coupled with a respective one of the first plurality of turnbuckle assemblies, and the second portion of the lug is positioned between, and coupled with, the first frame and the second frame of the second clamp jaw of the first clamp member;

for each one of a third plurality of the turnbuckle lugs, the first portion of the lug is coupled with a respective one of the second plurality of turnbuckle assemblies, and the second portion of the lug is positioned between, and coupled with, the first frame and the second frame of the first clamp jaw of the second clamp member; and for each one of a fourth plurality of the turnbuckle lugs, the first portion of the lug is coupled with a respective one of the second plurality of turnbuckle assemblies, and the second portion of the lug is positioned between, and coupled with, the first frame and the second frame of the second clamp jaw of the second clamp member.

26. The apparatus of claim 21, further comprising:
a first hinge and a second hinge; wherein
for each one of the first clamp jaw of the first clamp member, and the first clamp jaw of the second clamp member, the first frame is attached to the second frame, and the first end of each one of the first frame and the second frame is pivotally coupled with the first hinge;
for each one of the second clamp jaw of the first clamp member and the second clamp jaw of the second clamp member, the first frame is attached to the second frame, and the first end of each one of the first frame and the second frame is pivotally coupled with the second hinge; and
for each one of the first clamp jaw and the second clamp jaw of the first clamp member, and each one of the first clamp jaw and the second clamp jaw of the second clamp member:
the second end of each one of the first frame and the second frame comprises a radially outwardly extending portion and an ear extending transversely away from the radially outwardly extending portion, which facilitates clamping the first clamp member to the second clamp member.

27. The apparatus of claim 25, wherein:
the first portion of each of the turnbuckle lugs is adjacent to each one of the first frame and the second frame of the respective clamp jaw.

28. The assembly of claim 20, wherein;
the first plurality of turnbuckle assemblies are circumferentially spaced along the first clamp member; and
the second plurality of turnbuckle assemblies are circumferentially spaced along the second clamp member.

29. An apparatus for aligning sections of pipe, the apparatus comprising;
a first clamp member comprising a first clamp jaw and a second clamp jaw longitudinally spaced from the first clamp jaw;
a second clamp member hingedly coupled with the first clamp member, the second clamp member comprising a first clamp jaw and a second clamp jaw longitudinally spaced from the first clamp jaw;
a first plurality of turnbuckle assemblies, each being coupled with each one of the first clamp jaw and the second clamp jaw of the first clamp member;
a second plurality of turnbuckle assemblies, each being coupled with each one of the first clamp jaw and the second clamp jaw of the second clamp member; and
a plurality of spacers;
wherein each one of the first clamp jaw and the second clamp jaw of the first clamp member, and each one of the first clamp jaw and the second clamp jaw of the second clamp member, comprises a first frame and a second frame spaced from the first frame by at least a respective pair of the spacers, each one of the first frame and the second frame comprising a plurality of layered plates;
a plurality of turnbuckle lugs, each of the turnbuckle lugs comprising a first portion and a second portion integral with, and extending away from, the first portion; wherein
for each one of a first plurality of the turnbuckle lugs, the first portion of the lug is coupled with a respective one of the first plurality of turnbuckle assemblies, and the second portion of the lug is positioned between, and coupled with, the first frame and the second frame of the first clamp jaw of the first clamp member;
for each one of a second plurality of the turnbuckle lugs, the first portion of the lug is coupled with a respective one of the first plurality of turnbuckle assemblies, and the second portion of the lug is positioned between, and coupled with, the first frame and the second frame of the second clamp jaw of the first clamp member;
for each one of a third plurality of the turnbuckle lugs, the first portion of the lug is coupled with a respective one of the second plurality of turnbuckle assemblies, and the second portion of the lug is positioned between, and coupled with, the first frame and the second frame of the first clamp jaw of the second clamp member; and
for each one of a fourth plurality of the turnbuckle lugs, the first portion of the lug is coupled with a respective one of the second plurality of turnbuckle assemblies, and the second portion of the lug is positioned between, and coupled with, the first frame and the second frame of the second clamp jaw of the second clamp member;
wherein the first portion of each of the turnbuckle lugs is adjacent to each one of the first frame and the second frame of the respective clamp jaw;
wherein for each one of the first, second, third, and fourth pluralities of turnbuckle lugs:
the second portion of each turnbuckle lug is generally T-shaped and comprises a rectangular insert and a pair of posts integral with, and extending away from, the rectangular insert, the rectangular insert being integral with the first portion of the turnbuckle lug and being positioned between the first frame and the second frame of the respective clamp jaw; and
one of the posts is positioned within an aperture defined by the first frame of the respective one of the clamp jaws and the other one of the posts is positioned within an aperture defined by the second frame of the respective one of the clamp jaws.

30. An apparatus for aligning sections of pipe, the apparatus comprising;
a first clamp member comprising a first clamp jaw and a second clamp jaw longitudinally spaced from the first clamp jaw;
a second clamp member hingedly coupled with the first clamp member, the second clamp member comprising a first clamp jaw and a second clamp jaw longitudinally spaced from the first clamp jaw;
a first plurality of turnbuckle assemblies, each being coupled with each one of the first clamp jaw and the second clamp jaw of the first clamp member;
a second plurality of turnbuckle assemblies, each being coupled with each one of the first clamp jaw and the second clamp jaw of the second clamp member; and
a plurality of spacers;
wherein each one of the first clamp jaw and the second clamp jaw of the first clamp member, and each one of the first clamp jaw and the second clamp jaw of the second clamp member, comprises a first frame and a second frame spaced from the first frame by at least a respective pair of the spacers, each one of the first frame and the second frame comprising a plurality of layered plates;
a plurality of turnbuckle lugs, each of the turnbuckle lugs comprising a first portion and a second portion integral with, and extending away from, the first portion; wherein for each one of a first plurality of the turnbuckle lugs, the first portion of the lug is coupled with a respective one of the first plurality of turnbuckle assemblies, and the second portion of the lug is positioned between, and coupled with, the first frame and the second frame of the first clamp jaw of the first clamp member;

for each one of a second plurality of the turnbuckle lugs, the first portion of the lug is coupled with a respective one of the first plurality of turnbuckle assemblies, and the second portion of the lug is positioned between, and coupled with, the first frame and the second frame of the second clamp jaw of the first clamp member;

for each one of a third plurality of the turnbuckle lugs, the first portion of the lug is coupled with a respective one of the second plurality of turnbuckle assemblies, and the second portion of the lug is positioned between, and coupled with, the first frame and the second frame of the first clamp jaw of the second clamp member; and for each one of a fourth plurality of the turnbuckle lugs, the first portion of the lug is coupled with a respective one of the second plurality of turnbuckle assemblies, and the second portion of the lug is positioned between, and coupled with, the first frame and the second frame of the second clamp jaw of the second clamp member;

a plurality of threaded members; wherein each one of the first plurality of turnbuckle assemblies and each one of the second plurality of turnbuckle assemblies comprises a first clevis and a second clevis longitudinally spaced from the first clevis;

for each one of the first plurality of turnbuckle assemblies and each one of the second plurality of turnbuckle assemblies, one of the threaded members extends through a solid portion of the first clevis and into selective engagement with the second portion of a respective one of the first plurality of lugs and the second plurality of lugs, and another one of the threaded members extends through a solid portion of the second clevis into selective engagement with the second portion of the respective one of the third plurality of lugs and the fourth plurality of lugs.

31. The apparatus of claim 30, wherein:

each one of the threaded members comprises a bolt.

* * * * *